US011467677B2

(12) United States Patent
Sakagami et al.

(10) Patent No.: US 11,467,677 B2
(45) Date of Patent: Oct. 11, 2022

(54) INPUT PEN AND METHOD OF MANUFACTURING INPUT PEN

(71) Applicant: MITSUBISHI PENCIL COMPANY, LIMITED, Tokyo (JP)

(72) Inventors: Masashi Sakagami, Tokyo (JP); Kazuhiko Furukawa, Tokyo (JP); Hisanori Yanagi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/287,204

(22) PCT Filed: Nov. 5, 2019

(86) PCT No.: PCT/JP2019/043281
§ 371 (c)(1),
(2) Date: Apr. 21, 2021

(87) PCT Pub. No.: WO2020/095893
PCT Pub. Date: May 14, 2020

(65) Prior Publication Data
US 2021/0382567 A1    Dec. 9, 2021

(30) Foreign Application Priority Data

Nov. 6, 2018  (JP) .............................. JP2018-209086
Nov. 6, 2018  (JP) .............................. JP2018-209087
Dec. 12, 2018 (JP) .............................. JP2018-232996
Jul. 2, 2019  (JP) .............................. JP2019-123953

(51) Int. Cl.
*G06F 3/0354*    (2013.01)

(52) U.S. Cl.
CPC .............................. *G06F 3/03545* (2013.01)

(58) Field of Classification Search
CPC ....... G06F 3/03545; G06F 3/041; G06F 3/044
See application file for complete search history.

(56) References Cited

U.S. PATENT DOCUMENTS

| 5,023,408 A | 6/1991 | Murakami et al. |
| 5,889,512 A * | 3/1999 | Moller ............... G06F 3/03545 401/95 |
| 7,536,210 B1 * | 5/2009 | Morris ............... G06F 3/03545 455/575.8 |

(Continued)

FOREIGN PATENT DOCUMENTS

| CN | 201965567 U | 9/2011 |
| JP | 55-159440 U | 11/1980 |

(Continued)

OTHER PUBLICATIONS

International Search Report dated Feb. 10, 2020, issued in counterpart International Application No. PCT/JP2019/043281 (3 pages).

(Continued)

*Primary Examiner* — Carolyn R Edwards
(74) *Attorney, Agent, or Firm* — WHDA, LLP

(57) ABSTRACT

An input pen is disclosed including a wood shaft, a mounting hole that is formed at an axial center of the wood shaft, and an input body that is rod-shaped and is mounted in the mounting hole, and wherein an inner side surface of the mounting hole and an outer side surface of the input body are fixed.

9 Claims, 59 Drawing Sheets

(56) References Cited

U.S. PATENT DOCUMENTS

| | | | | |
|---|---|---|---|---|
| 8,373,682 | B2* | 2/2013 | Liang | G06F 3/03545 |
| | | | | 401/116 |
| 8,593,437 | B2* | 11/2013 | Liang | B43K 24/14 |
| | | | | 401/99 |
| 2002/0070927 | A1* | 6/2002 | Fujitsuka | G06F 3/046 |
| | | | | 345/179 |
| 2014/0085270 | A1* | 3/2014 | Obata | G06F 3/03545 |
| | | | | 345/179 |
| 2016/0162053 | A1 | 6/2016 | Obata | |
| 2017/0285772 | A1* | 10/2017 | Yamamoto | G06F 3/04162 |
| 2018/0164908 | A1 | 6/2018 | Tanaka et al. | |
| 2020/0089340 | A1* | 3/2020 | Ruscher | G06F 3/03545 |

FOREIGN PATENT DOCUMENTS

| | | |
|---|---|---|
| JP | 9-6515 A | 1/1997 |
| JP | 2002-137957 A | 5/2002 |
| JP | 2009-12357 A | 1/2009 |
| JP | 2009-86925 A | 4/2009 |
| JP | 2016-115029 A | 6/2016 |
| JP | 2017-216002 A | 12/2017 |
| JP | 2018-97458 A | 6/2018 |
| JP | 2019-46037 A | 3/2019 |
| WO | 2016/031329 A1 | 3/2016 |

OTHER PUBLICATIONS

Extended (Supplementary) European Search Report dated Jul. 11, 2022, issued in counterpart application No. 19880994.9 (11 pages).

* cited by examiner

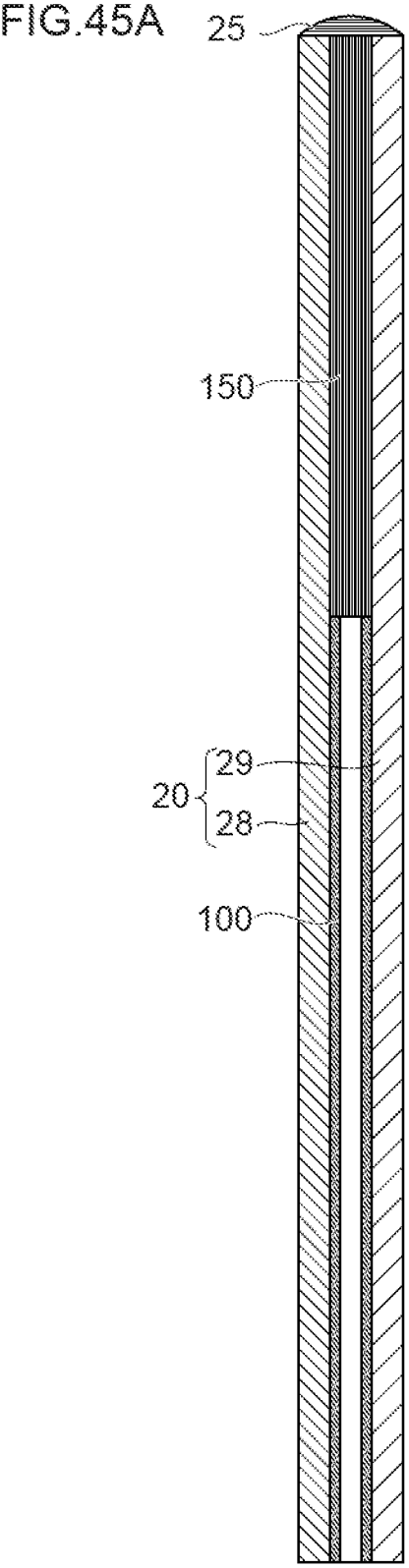

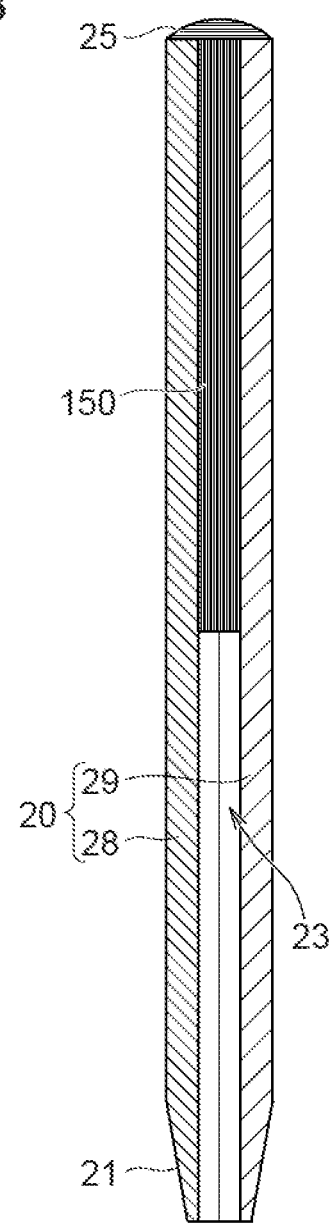

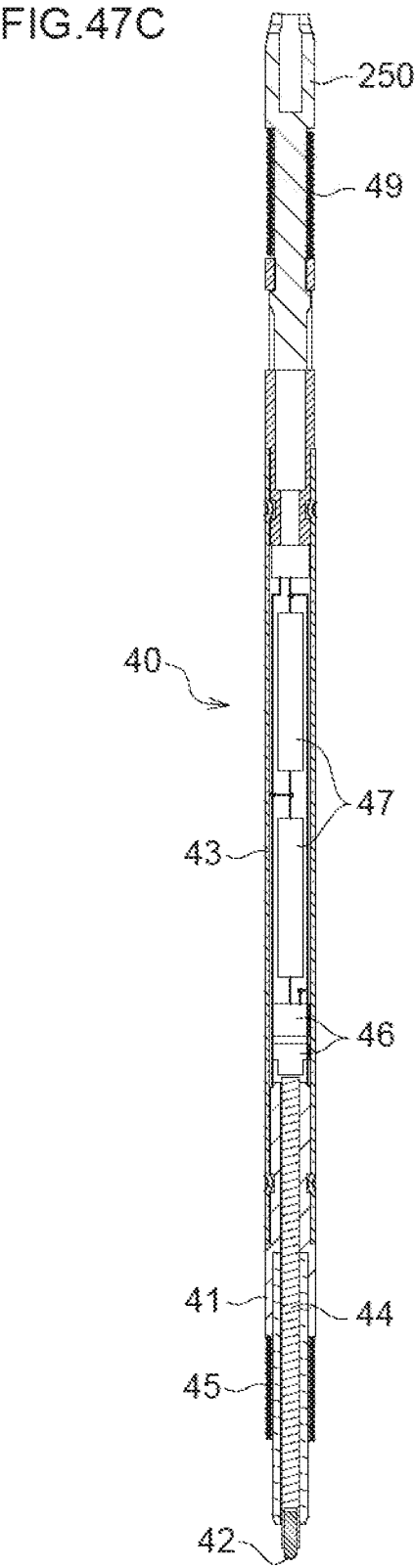

FIG.54
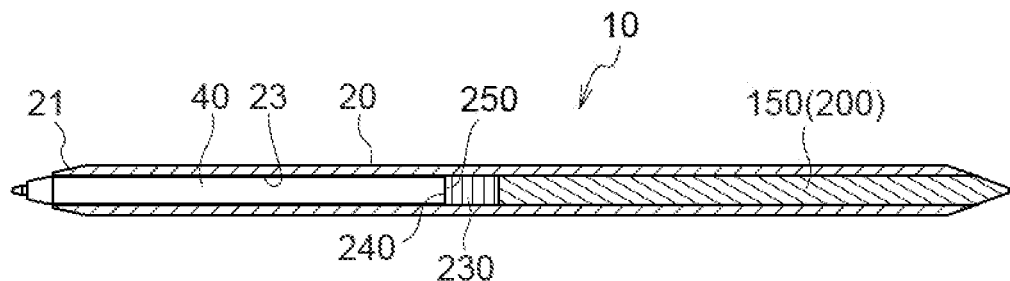
FIG.55
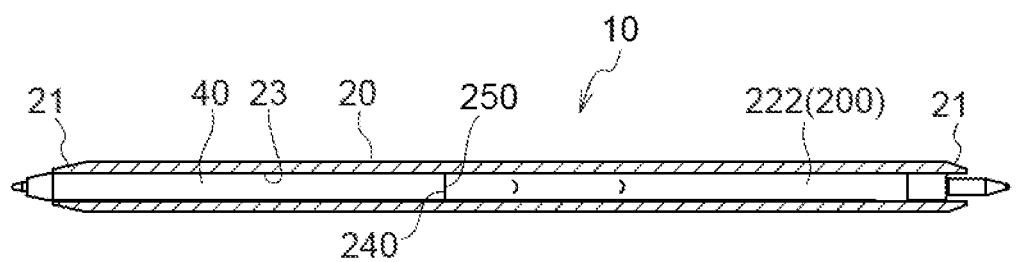
FIG.56
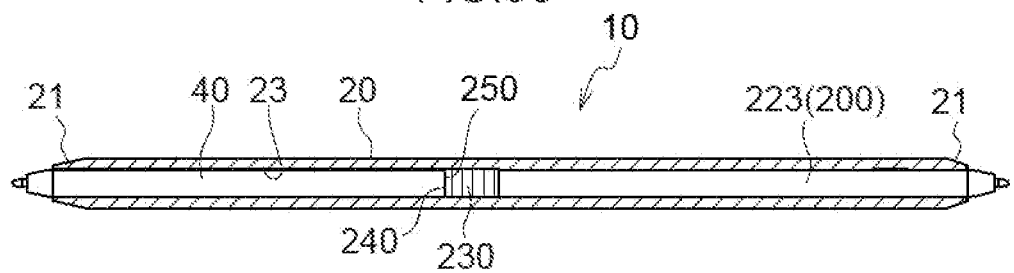
FIG.57A
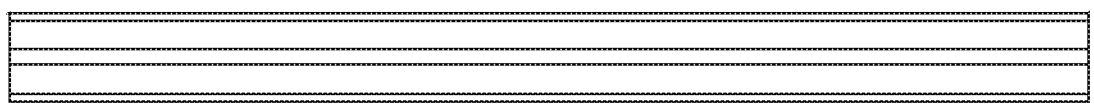

INPUT PEN AND METHOD OF MANUFACTURING INPUT PEN

TECHNICAL FIELD

The present invention relates to an input pen in which an input body is mounted within a wood shaft, and to a method of manufacturing the input pen.

BACKGROUND ART

Input pens that carry out input by physically contacting a screen have been widely used in recent years. Namely, an input surface of an input device, which is plate-shaped and at which a position detecting device is provided, is contacted by a position indicator that is formed in the form of a pen, and the position of contact is detected.

There are various types of such an input pen, such as a pressure sensitive type, an electrostatic capacitance type, an electromagnetic induction type and the like, in accordance with the mode of the physical changes that the input surface undergoes. Further, as classifications of input pens, there are an active type that has an electronic circuit built therein and that itself is involved in the generation of signals, and a passive type that does not have an electronic circuit built therein and that carries out only a physical action on the input surface. The electromagnetic induction type belongs to the former, and the pressure sensitive type belongs to the latter. Note that the electrostatic capacitance type includes both an active type, which has an electronic circuit built therein and which actively generates static electricity at the distal end, and a passive type that does not have an electronic circuit built therein, and that ensures a conductive path between the distal end and a finger, and that varies the electrostatic capacitance of the input surface as a so-called extension of the fingertip.

Among the above-described various types of input pens, at an electromagnetic induction type, an electromagnetic induction coil, which resonates with respect to electromagnetic waves of a specific frequency that are generated by the position detecting device that is set beneath the input surface of the input device, is provided within the input pen, and the position at which this resonance arises is recognized as the input position.

Further, there are many cases in which structures for realizing these various types are formed in the shape of a rod and used as the input body, and a structure in which this input body is mounted in a shaft tube is made to be the input pen.

For example, in Japanese Patent Application Laid-Open (JP-A) No. 2019-46037, by making the substance of the shaft tube, in which the input body is mounted, be a wood material, in a case in which the input body is accommodated in the shaft tube and an electromagnetic induction touch pen is formed, the material of the shaft tube can be prevented from being affected by the electromagnetic induction and becoming unable to input.

SUMMARY OF INVENTION

Technical Problem

In an input pen that uses a wood material as the shaft tube, it must be made such that the mounted input body does not, during usage, fall-out from the wood shaft that is the shaft tube that is made of a wood material. In the invention disclosed in aforementioned JP-A No. 2019-46037, the input body is inserted in the wood shaft by using the slight clearance (e.g., less than 0.2 mm) between the input body and the wood shaft at the time of mounting the input body to the wood shaft. However, there is the concern that, due to the wobbling that arises due to the wood shaft and the input body rubbing against one another at this time, the input body will break and will not be able to be used as an input pen. In particular, in a case in which the input body is used as an active type input pen, at the time of mounting the input body to the wood shaft, it is absolutely necessary to avoid damaging the electronic circuit that is built-in. Moreover, there is also the concern that the wood shaft will be damaged due to the wobbling that arises due to the wood shaft and the input body rubbing against one another at the time of mounting the input body.

Thus, embodied aspects of the present invention have, as the topic thereof, the provision of an input pen in which the input body is mounted so as to never fell-out during use, while avoiding damage to the input body due to the wobbling that arises due to the shaft and the input body rubbing against one another at the time when the input body is mounted to the wood shaft.

Solution to Problem

An input pen of a first embodied aspect of the present invention comprising: a wood shaft, a mounting hole that is formed at an axial center of the wood shaft, and an input body that is rod-shaped and is mounted in the mounting hole, wherein an inner side surface of the mounting hole and an outer side surface of the input body are fixed.

In an input pen relating to a second embodied aspect of the present invention, in addition to the feature of the first embodied aspect, at the input body, a ferrite core that is positioned at an axial center, an electromagnetic induction coil that is disposed at an outer periphery of the ferrite core, a contacting distal end that is mounted to a distal end of the ferrite core, and a writing pressure sensing portion that senses pressing force applied to the contacting distal end, are structured as a refill. Namely, in the present embodied aspect, the input body is an electromagnetic induction type.

In an input pen relating to a third embodied aspect of the present invention, in addition to the feature of the second embodied aspect, the input pen has a binding agent that is interposed between the inner side surface of the mounting hole and the outer side surface of the input body, and that binds the input body to the mounting hole.

In an input pen relating to a fourth embodied aspect of the present invention, addition to the feature of the second embodied aspect, the wood shaft is formed by two members being affixed together by an affixing agent.

In an input pen relating to a fifth embodied aspect of the present invention, in addition to the feature of the third embodied aspect, the wood shaft is formed by two members being affixed together by an affixing agent.

In an input pen relating to a sixth embodied aspect of the present invention, in addition to the feature of the second embodied aspect, a reinforcing resin is made to seep into the mounting hole.

In an input pen relating to a seventh embodied aspect of the present invention, in addition to the feature of the third embodied aspect, a reinforcing resin is made to seep into the mounting hole.

In an input pen relating to an eighth embodied aspect of the present invention, in addition to the feature of the second embodied aspect, the mounting hole passes through the axial center of the wood shaft from a distal end to a rear end, the input body is mounted to one end side of the mounting hole, and a second input body is further mounted to another end side of the mounting hole.

In an input pen relating to a ninth embodied aspect of the present invention, in addition to the feature of the third embodied aspect, the mounting hole passes through the axial center of the wood shaft from a distal end to a rear end, the input body is mounted to one end side of the mounting hole, and a second input body is further mounted to another end side of the mounting hole.

In an input pen relating to a tenth embodied aspect of the present invention, in addition to the feature of the second embodied aspect, the input body is accommodated in the mounting hole, an insertion restricting portion, which demarcates an insertion limit of the input body in the mounting hole, is provided at a midway portion of the wood shaft, and a rear end of the input body is formed as a press-contact portion that press-contacts the insertion restricting portion.

In an input pen relating to an eleventh embodied aspect of the present invention, in addition to the feature of the tenth embodied aspect, the mounting hole is a hole with a bottom that is from one end of the wood shaft to the midway portion, a bottom surface, which faces a distal end side, of the hole with a bottom is the insertion restricting portion, and a fit-together concave portion is formed at the bottom surface at the insertion restricting portion, a fit-together convex portion that serves as the press-contact portion is formed at the rear end of the input body, and the input body engages with the wood shaft due to the fit-together convex portion fitting together with the fit-together concave portion.

In an input pen relating to a twelfth embodied aspect of the present invention, in addition to the feature of the tenth embodied aspect, the mounting hole is a hole with a bottom that is from one end of the wood shaft to the midway portion, a bottom surface, which faces a distal end side, of the hole with a bottom is the insertion restricting portion, and magnetic force attracting portions that attract one another by magnetic forces are provided at the bottom surface at the insertion restricting portion and at the rear end of the input body, and the input body engages with the wood shaft due to the magnetic force attracting portion of the insertion restricting portion and the magnetic force attracting portion of the input body that serves as the press-contact portion attracting one another.

In an input pen relating to a thirteenth embodied aspect of the present invention, in addition to the feature of the tenth embodied aspect, the mounting hole is a hole with a bottom that is from one end of the wood shaft to the midway portion, a bottom surface, which faces a distal end side, of the hole with a bottom is the insertion restricting portion, and a puncturing portion, which projects out rearward and serves as the press-contact portion, is provided at the rear end of the input body, and the input body engages with the wood shaft due to the insertion restricting portion being punctured by the puncturing portion.

In an input pen relating to a fourteenth embodied aspect of the present invention, in addition to the feature of the tenth embodied aspect, the mounting hole that serves as a through-hole is firmed in the axial center of the wood shaft, an inserted member, which reaches the midway portion of the wood shaft, is inserted in from a rear end of the mounting hole, and a distal end of the inserted member is the insertion restricting portion.

A fifteenth embodied aspect of the present invention is a method of manufacturing an input pen of an embodied aspect having the feature of the above-described fifth embodied aspect, and comprises: a step of, at one wood shaft member among the two members that has a groove that is semicircular in cross-section, placing, in the groove, a synthetic resin rod that is in a state in which the binding agent has been applied to a surface thereof, or placing, in the groove, a synthetic resin rod in a state in which the binding agent has been applied to the groove; a step of affixing, to the one wood shaft member and by the affixing agent, another wood shaft member among the two members that has a groove of a same shape as the groove; a step of forming the wood shaft from the two members that have been affixed together; a step of pulling the synthetic resin rod out from the wood shaft and forming the mounting hole; and a step of inserting the input body into the mounting hole with the binding agent interposed therebetween.

Advantageous Effects of Invention

Because the embodied aspects of the present invention are structured as described above, there can be provided an input pen in which an input body is mounted so as to never fall out during use, while avoiding damage to the input body that is due to the wobbling that arises clue to a shaft and the input body rubbing against one another at the time when the input body is mounted to the wood shaft.

BRIEF DESCRIPTION OF DRAWINGS

FIG. 45A shows a manufacturing step of the input pen of FIG. 43 in a front sectional view.

FIG. 46B shows a manufacturing step of the input pen of FIG. 43 in a front sectional view.

FIG. 47C shows the digitizer unit, which is used in the input pens of the eleventh embodiment and the twelfth embodiment, in a side sectional view.

FIG. 54 shows a third example of the eleventh embodiment in a partial side sectional view.

FIG. 55 shows a fourth example of the eleventh embodiment in a partial side sectional view.

FIG. 56 shows a fifth example of the eleventh embodiment in a partial side sectional view.

FIG. 57A shows the wood shaft, which is used in the twelfth embodiment, in a front view.

DESCRIPTION OF EMBODIMENTS

Embodiments of the present invention are described hereinafter with reference to the drawings. Note that, in the following explanation, the side at which a contacting distal end 42 of an input pen 10 is positioned is called the "distal end", and the side opposite thereto is called the "rear end". Further, for any given structure, the direction facing the distal end is called "frontward", and the direction opposite thereto is called "rearward".

First Embodiment

Figure 1:
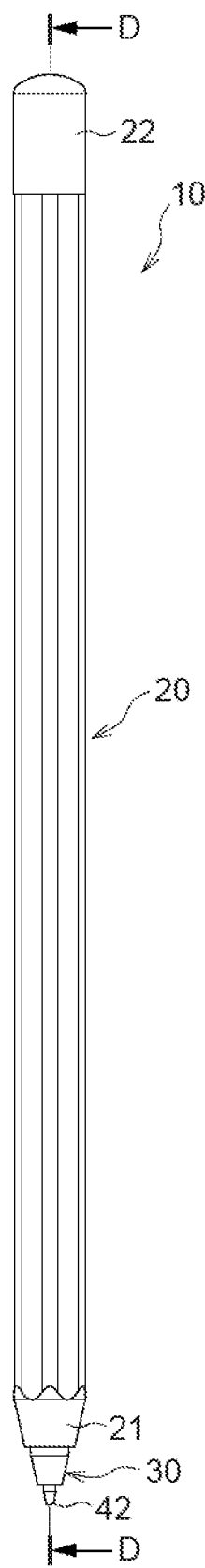
FIG. 1 is a front view showing the external appearance of an input pen relating to a first embodiment.
Figure 2:
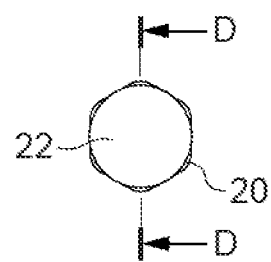
FIG. 2 is a plan view of the input pen of FIG. 1.
Figure 3:
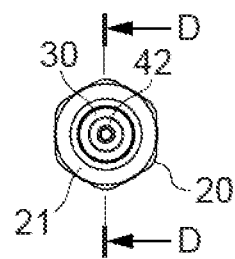
FIG. 3 is a bottom view of the input pen of FIG. 1.

As shown in the front view of FIG. 1, the plan view of FIG. 2 and the bottom view of FIG. 3, the input pen 10 relating to the first embodiment of the present invention presents an external appearance in which the contacting distal end 42 of an input body 30 projects out from the distal end of a pencil-like wood shaft 20 that is hexagonal in cross-section. The distal end of the wood shaft 20 is a taper portion 21 that is cut in a tapered form. Further, a tail cap 22, which is cylindrical tube shaped and whose rear end is formed as a spherical surface, is mounted to the rear end of the wood shaft 20. The side surfaces of the wood material that is the material of the wood shaft 20 are coated for the purposes of protecting the surfaces, and reinforcement and decoration.

Figure 4:
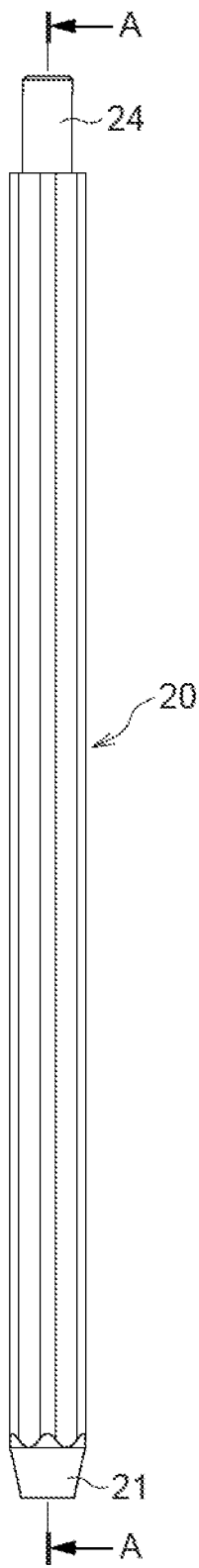
FIG. 4 is a front view of a wood shaft at the input pen of FIG. 1.

FIG. 4 is a front view of the wood shaft 20 at the input pen of FIG. 1. The distal end of the wood shaft 20 is the taper portion 21 that is cut in a tapered form as described above. The rear end of the wood shaft 20 is formed in the shape of a cylindrical tube whose outer diameter is reduced, and this portion is reduced diameter portion 24 to which the above-described tail cap 22 is mounted.

Figure 5:
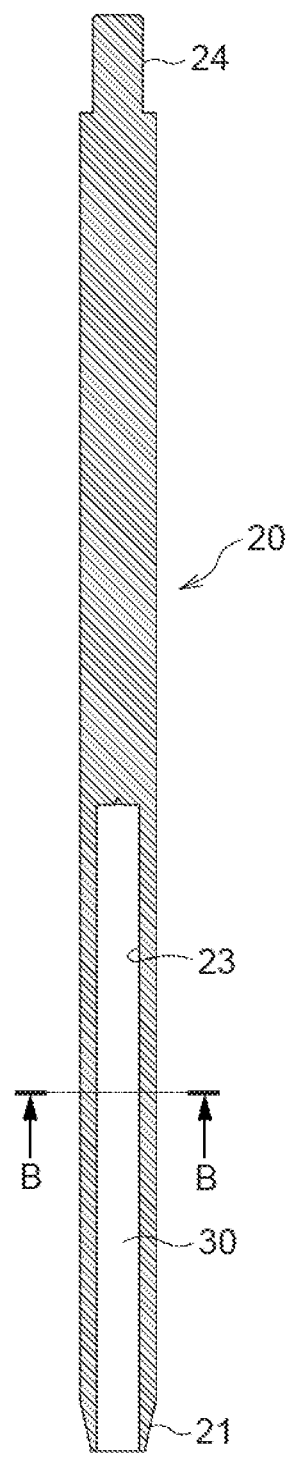
FIG. 5 is an A-A cross-sectional view of the wood shaft of FIG. 4.
Figure 6:
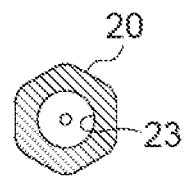
FIG. 6 is a B-B cross-sectional view of the wood shaft of FIG. 5.

FIG. 5 shows the wood shaft 20 of FIG. 4 in an A-A cross-section. A mounting hole 23, which is a hole that is bred-out along the axial center, is provided in the front half portion of the wood shaft 20. As shown in FIG. 6 that is the B-B cross-section of FIG. 5, the wood shaft 20 presents a hexagonal cross-section, like a pencil, and the mounting hole 23 is formed in the axial center thereof.

Figure 7:
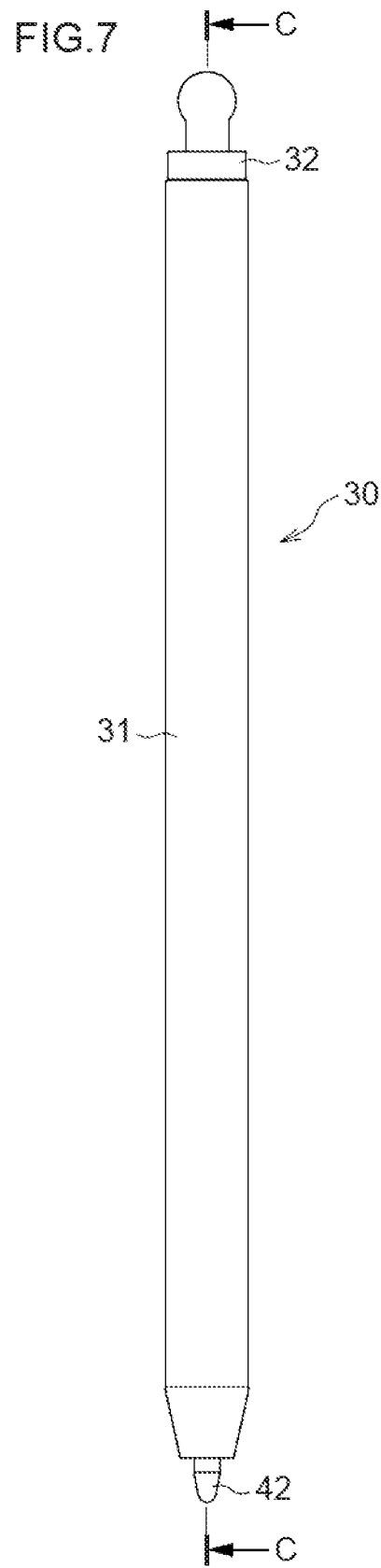
FIG. 7 is a front view showing the external appearance of an input body at the input pen of FIG. 1.

FIG. 7 shows, in a front view, the external appearance of the input body 30 at the input pen 10 of FIG. 1. At the input body 30, a digitizer unit 40 that is described later is built-into the interior of an outer tube 31 that is tubular, and the aforementioned contacting distal end 42 projects out from the distal end. Further, a supporting cap 32 is mounted to the rear end. The outer tube 31 is formed of a polycarbonate ABS (PC/ABS) polymer alloy resin.

Figure 8:
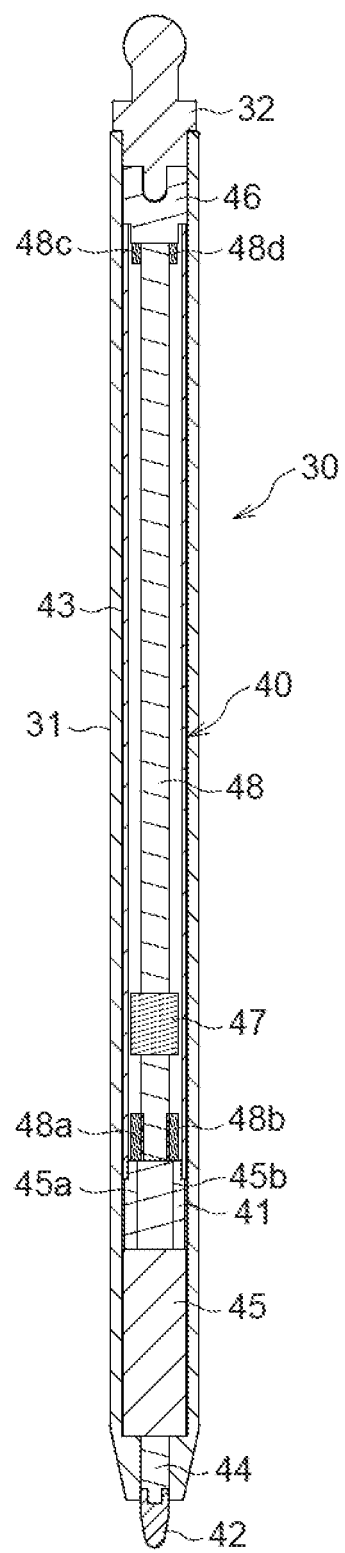
FIG. 8 is a C-C cross-sectional view of the input body of FIG. 7.
Figure 9:
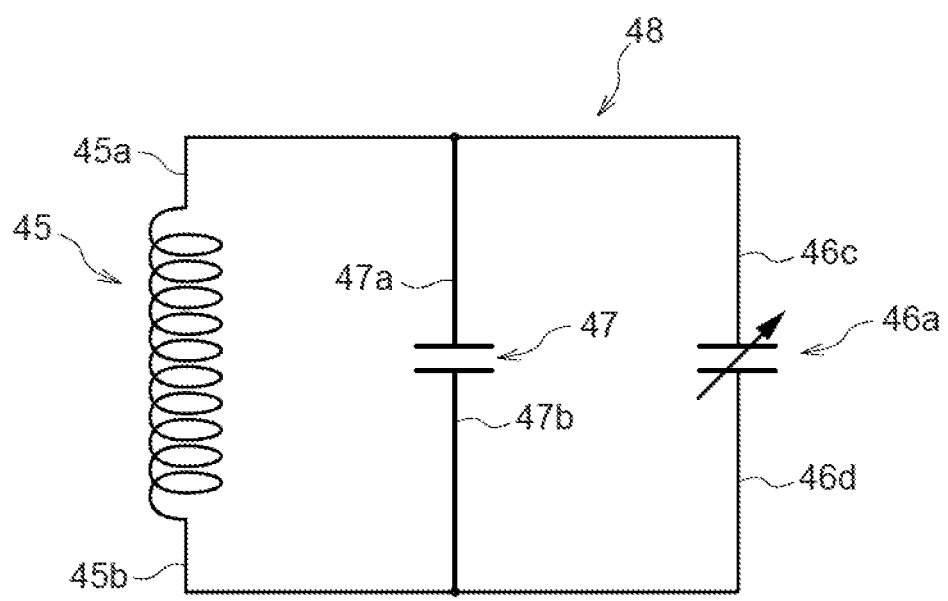
FIG. 9 is a circuit diagram of an electromagnetic induction coil at the input pen of FIG. 1.

FIG. 8 shows the input body 30 of FIG. 7 in a C-C cross-section. The digitizer unit 40 that is built in the outer tube 31 has a structure in which a rod-shaped ferrite core 44 around which an electromagnetic induction coil 45 is wound is mounted via a distal end coupling 41 to the distal end of an accommodating tube 43 in which is built a circuit board 48 on which a capacitor 47 is packaged, and further, a writing pressure sensing section 46 in accordance with a variable capacitance capacitor 46a is mounted to the rear end of this accommodating tube 43. The contacting distal end 42 that is made of a synthetic resin is fixed to the distal end of the ferrite core 44. Two legs 47a, 47b of the capacitor 47 are connected respectively to two distal end side terminals 48a, 48b by wiring of the circuit board 48, and are also connected respectively to two rear end side terminals 48c, 48d. The distal end side terminals 48a, 48b are connected respectively to extension wires 45a, 45b of both ends of the electromagnetic induction coil 45. The rear end side terminals 48c, 48d are connected respectively to two legs 46c, 46d of the variable capacitance capacitor 46a (see FIG. 9) that is within the writing pressure sensing section 46. This variable capacitance capacitor 46a detects, as variations in the electrostatic amount, the pressure that is applied by the writing pressure that is applied to the contacting distal end 42. The above-described ferrite core 44, electromagnetic induction coil 45, variable capacitance capacitor 46a and capacitor 47 are electronic parts that are built-in within the input body 30, and form the parallel resonance circuit shown in FIG. 9 by the wiring of the circuit board 48. Further, the supporting cap 32 that supports the rear end of the writing pressure sensing section 46 is mounted to the rear end of the outer tube 31.

The input body 30 shown in FIG. 7 is inserted in the mounting hole 23 (see FIG. 5) of the wood shaft 20 shown in FIG. 4, and this becomes the electromagnetic induction type input pen 10 shown in FIG. 1. A drawing showing this input pen 10 in the D-D cross-section of FIG. 1. FIG. 2 and FIG. 3 is FIG. 10. Note that the internal structure of the input body 30 is omitted from FIG. 10. The majority of the input body 30 is accommodated in the mounting hole 23, and only the distal end portion that includes the contacting distal end 42 projects out from the distal end of the wood shaft 20. Note that the tail cap 22 is mounted so as to cover the reduced diameter portion 24 of the rear end of the wood shaft 20.

Figure 10:
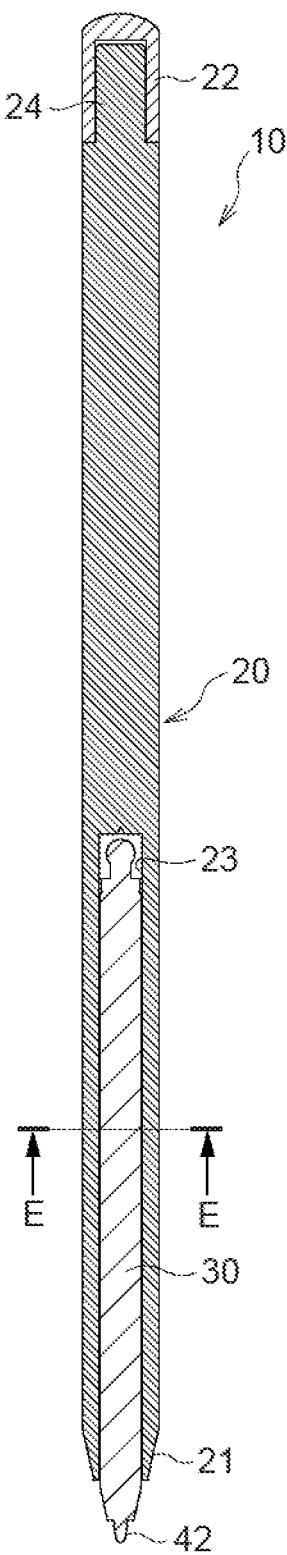
FIG. 10 is a D-D cross-sectional view of FIG. 1, FIG. 2 and FIG. 3.
Figure 11:
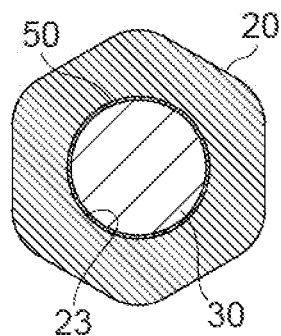
FIG. 11 is an E-E cross-sectional view of FIG. 10.

FIG. 11 shows the E-E cross-section of FIG. 10. Note that the internal structure of the input body 30 is omitted. A binding agent 50 is interposed between the inner side surface of the mounting hole 23 of the wood shaft 20 and the outer side surface of the input body 30. The binding agent 50 is a structure for binding the input body 30 to the mounting hole 23. An adhesive that is suited to the adhering of a wood material and a plastic (in particular, PC/ABS polymer alloy resins) can be used as the binding agent 50. For example, synthetic rubber latex adhesives that are aqueous adhesives, rubber solvent adhesives that are solvent adhesives, and epoxy resin adhesives that are reactive adhesives can be used as this adhesive.

Here, because electronic parts are built into the input body 30 as described above, there is the concern that, if the input body 30 is mounted into the mounting hole 23 by being press-fit therein, this will damage the electronic parts, and there is the possibility of bringing about problems in usage of the input pen 10. Therefore, in the present embodiment, the inner diameter of the mounting hole 23 is a length of an extent such that the input body 30 can be inserted therein without being press-fit, or, in other words, is a length of an extent such that the input body 30 is fit-in with play.

Further, by fitting the input body 30 in with play after the binding agent 50 has been applied to the inner side surface of the mounting hole 23, it is possible to mount the input body 30 to the wood shaft 20 without excessive force being applied to the input body 30, and, at the same time, the wood shaft 20 is not damaged at the time of mounting. If the binding agent 50 solidifies after the input body 30 is mounted, the input body 30 is completely bonded to the mounting hole 23, and will not fill-out during use. Further, it is desirable to fill the binding agent 50 in between the mounting hole 23 and the input body 30.

Figure 12:
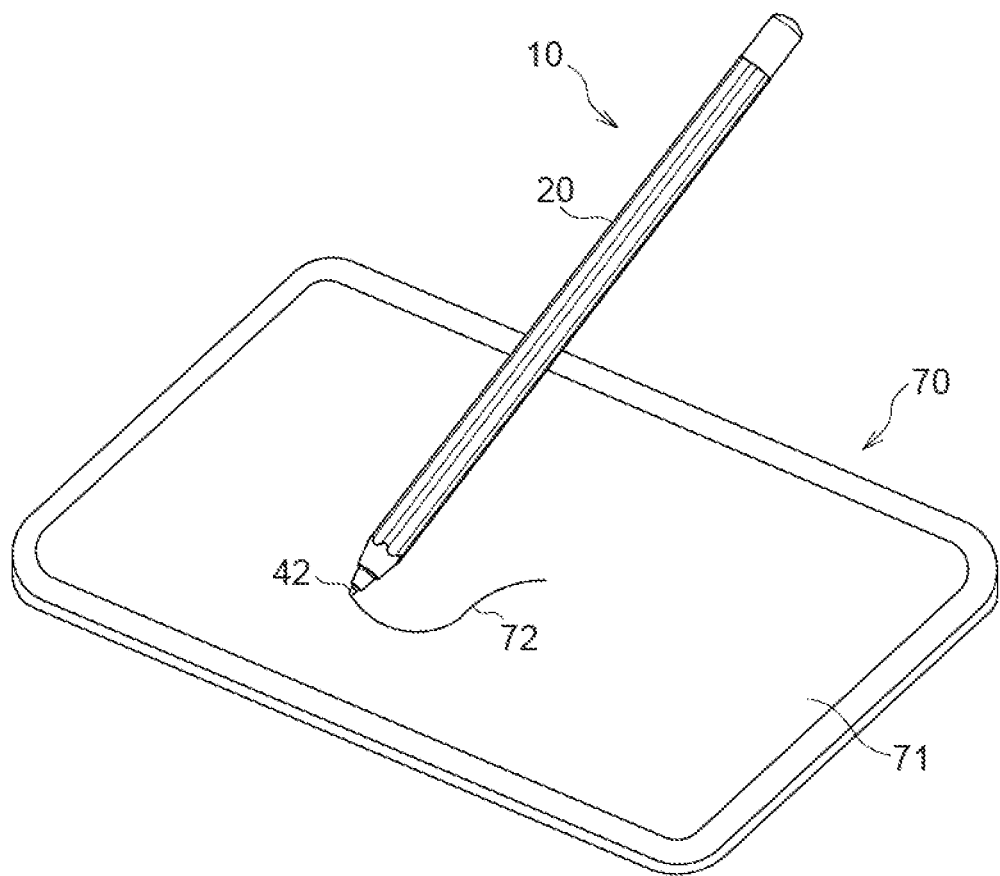
FIG. 12 is a perspective view showing a state of usage of the input pen of FIG. 1.

FIG. 12 shows a state of usage of the input pen 10 of the present embodiment. An unillustrated position detecting device, which periodically generates electromagnetic waves of a specific frequency, is provided at the lower surface of an input surface 71 of an input device 70. Further, when the top of the input surface 71 is traced like drawn line 72 by the contacting distal end 42 of the input pen 10, the contacting distal end 42 is pressed. At this time, the parallel resonance circuit shown in FIG. 9 resonates due to the electromagnetic waves, and electricity that is generated at the electromagnetic induction coil 45 accumulates in the capacitor 47. Due to the input pen 10 transmitting the electromagnetic waves, which are generated by this electricity flowing through the electromagnetic induction coil 45, and the aforementioned position detecting device, receiving these, the input device 70 recognizes the position at which this electromagnetic induction arises as coordinate information, and the drawn line 72 is thereby recorded as electronic data. Here, at the variable capacitance capacitor 46a, because the electric capacitance varies due to the pressing force of the contacting distal end 42, the frequency of the electromagnetic waves that are transmitted by the input pen 10 can be varied due thereto. Due to these variations in frequency being sensed by the aforementioned position detecting device, they can be recognized as various attributes relating to the drawn line 72. These various attributes are, for example, the thickness and color of the drawn line 72, or the switching of the drawing mode (writing mode and erasing mode).

Here, a wood material whose air-dried specific gravity is less than 1, for example, is the type that is used as the material of the wood shaft 20, and examples thereof are Japanese cypress (hinoki), hinoki leaf, paulownia, teak, mahogany, Japanese cedar, pine, cherry, bamboo. Japanese ash, white ash, white fir, hard maple, incense cedar, linden, balsa, and the like. Further, not only pure wood materials, but also wood-based materials such as compression-formed materials in which lumber from thinning, chips of waste wood, wood articles or the like are collected and solidified, can also be used. Further, the moisture content at this time is less than 20%. Note that the moisture content can be measured by using the electric moisture meter MR-200II (Sanko Electronic Laboratory).

Here, the significance of using the wood shaft 20 as the shaft tube of the input pen 10 is as follows.

Organic materials such as natural wood materials are better for the environment than inorganic materials such as synthetic rubbers or synthetic resins, and are produced of natural materials, and, further, even for persons who are operating computers, can provide a sense of calm clue to the fragrance of the wood. Further, there are also the other effects that, by using a wood material, because the wood material is tough and is also highly resistant to impact, it is difficult for the wood shaft 20 to break, and further, the sound at the time of being dropped or the like is absorbed. Moreover, there is also the advantage that, when the wood material is coated, the color of the vessels of the wood material is stained richly, the grain stands-out, and the finish is beautiful.

Further, because wood materials absorb moisture, even if fingers sweat, the wood material absorbs the sweat of the fingertips, and the fingers do not slip due to the sweat. Moreover, because the hands of the user directly touch the bark of the wood shaft 20, the warmth of the wood is transmitted, and an improvement in work efficiency is anticipated.

Further, the more that wood materials are used, the more that a particular elegant simplicity arises thereat, and they can provide a unique, refined sensation.

Therefore, in a work environment in which daily life is surrounded by inorganic, insipid, electronic members, the psychological effects of de-stressing and soothing by the unique feel and warmth that the wood shaft 20 has can be anticipated. Further, due to the individually-specific characteristics such as the unique fluctuations and textures and the like of respectively different wood grain patterns, an awareness specific thereto awakens proportionately to the frequency of use over a long period of time, and the mentally relaxing effects of enjoying daily care and the like can also be expected.

Further, in an environment in which it is easy for both digital equipment and non-digital, analog products to exist such as in academic settings, by using a material that approximates those of pencils and the like that are used as writing instruments, the input pen 10 can be used without a sense of incongruity.

Moreover, the input body 30 that is more dense as compared with the wood shaft 20 that is relatively light is mounted in the front half portion. Therefore, because the center of gravity of the input pen 10 is further toward the front side, the sense of stability at the time when the input pen 10 is grasped by fingers increases, and the feel of usage also can be improved.

Second Embodiment

Figure 13:
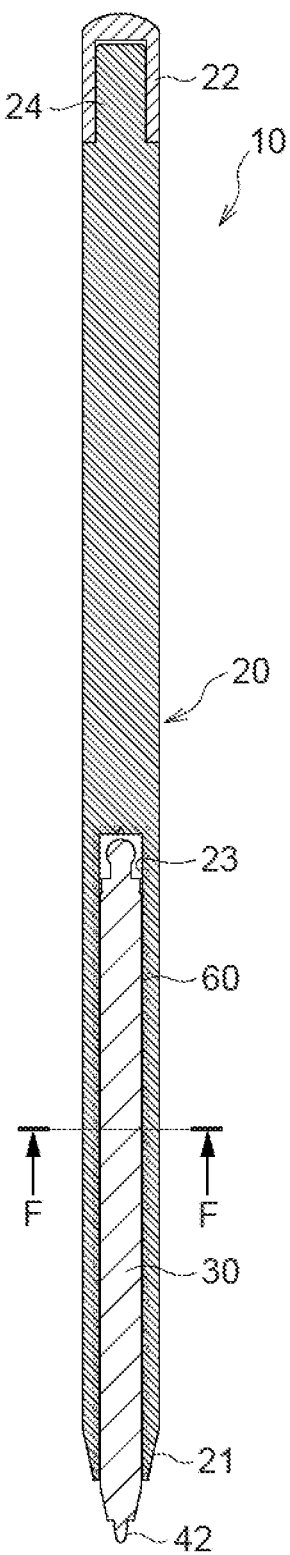
FIG. 13 shows the input pen relating to a second embodiment in a front sectional view.

FIG. 13 shows the input pen 10 relating to the second embodiment in a front sectional view. The external appearance of the input pen 10 relating to the present embodiment is similar to that of the first embodiment (see FIG. 1), but the second embodiment differs from the first embodiment with regard to the point that a reinforcing resin 60 is made to seep into the inner side surface of the mounting hole 23 of the wood shaft 20. For example, a two-liquid epoxy resin can be used as this reinforcing resin 60. By applying such a reinforcing resin 60 to the inner side surface of the mounting hole 23 and leaving it for a predetermined period of time, the reinforcing resin solidifies in a state of having seeped into the wood material that is in the vicinity of the inner side surface of the mounting hole 23 as shown in FIG. 13, and, due thereto, the inner side surface of the mounting hole 23 is reinforced. Therefore, the strength of the thin-walled portions such as the taper portion 21 of the wood shaft 20 increases, and the possibility of damage at the time of mounting the input body 30 or during use can be reduced.

Figure 14:
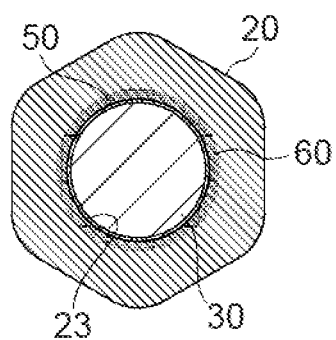
FIG. 14 is an F-F cross-sectional view of FIG. 13.

Note that, in the present embodiment as well, as shown in FIG. 14 that is the F-F cross-sectional view of FIG. 13, the binding agent 50 is interposed between the inner side surface of the mounting hole 23 of the wood shaft 20 and the outer side surface of the input body 30. The significance of this binding agent 50 is similar to that of the first embodiment. In the present embodiment, because a layer into which the reinforcing resin 60 has seeped exists at the inner side surface of the mounting hole 23, the strength of the wood shaft 20 increases more so than in the above-described first embodiment.

The structure of the input body 30, the state of usage of the input pen 10, and the significance of using the wood shaft 20 also are similar to those of the above-described first embodiment.

Third Embodiment

Figure 15:
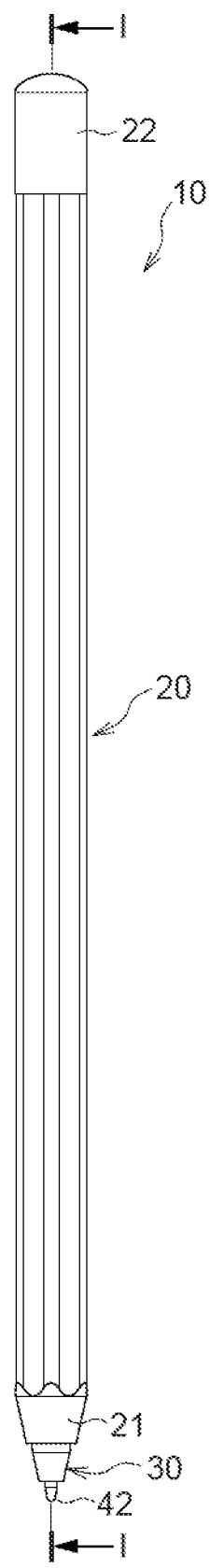
FIG. 15 is a front view showing the external appearance of the input pen relating to a third embodiment.
Figure 16:
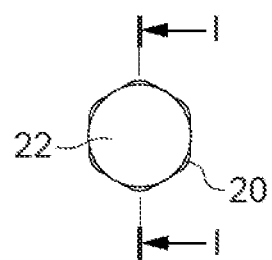
FIG. 16 is a plan view of the input pen of FIG. 15.
Figure 17:
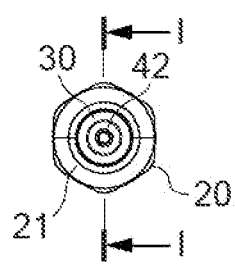
FIG. 17 is a bottom view of the input pen of FIG. 15.

As shown in the front view of FIG. 15, the plan view of FIG. 16 and the bottom view of FIG. 17, the input pen 10 relating to the third embodiment of the present invention presents an external appearance in which the contacting distal end 42 of the input body 30 projects out from the distal end of the pencil-like wood shaft 20 that is hexagonal in cross-section. The distal end of the wood shaft 20 is the taper portion 21 that is cut in a tapered form. Further, the tail cap 22, which is cylindrical tube shaped and whose rear end is formed as a spherical surface, is mounted to the rear end of the wood shaft 20. The side surfaces of the wood material that is the material of the wood shaft 20 are coated for the purposes of protecting the surfaces, and reinforcement and decoration.

Figure 18:
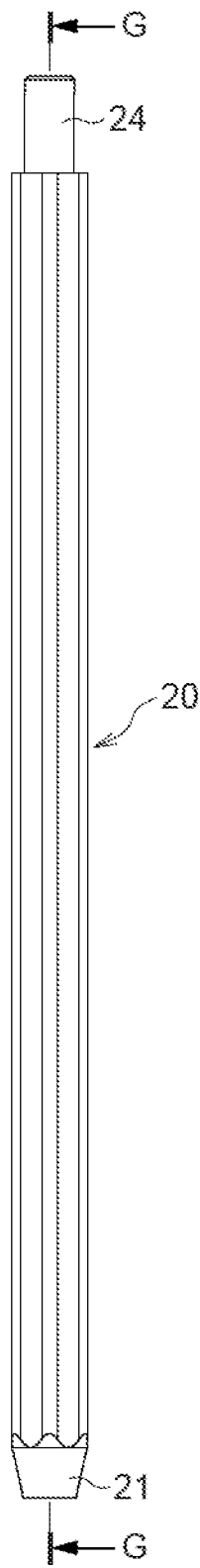
FIG. 18 is a front view of the wood shaft at the input pen of FIG. 15.

FIG. 18 is a front view of the wood shaft 20 at the input pen of FIG. 15. The distal end of the wood shaft 20 is the taper portion 21 that is cut in a tapered form as described above. The rear end of the wood shaft 20 is formed in the shape of a cylindrical tube whose outer diameter is reduced, and this portion is the reduced diameter portion 24 to which the above-described tail cap 22 is mounted.

Figure 19:
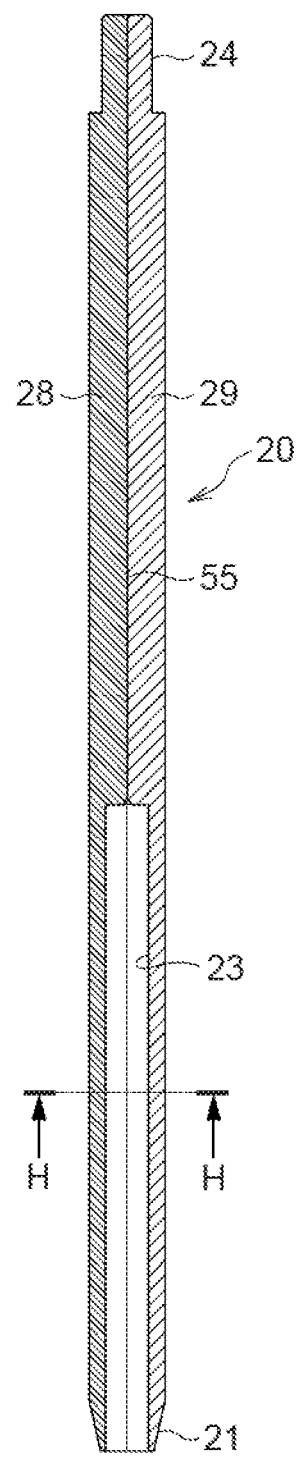
FIG. 19 is a G-G cross-sectional view of the wood shaft of FIG. 18.
Figure 20:
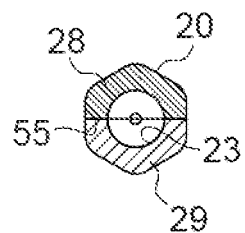
FIG. 20 is an H-H cross-sectional view of the wood shaft of FIG. 19.

FIG. 19 shows the wood shaft 20 of FIG. 18 in a G-G cross-section. In the present embodiment, the wood shaft 20 is formed by two members, i.e., wood shaft members 28, 29, being affixed together by an affixing agent 55. These wood shaft members 28, 29 are usually formed of the same tree species, but wood materials of different tree species may be used. An adhesive that can be used in adhering wood materials together, e.g., wood glue, can be used as this affixing agent 55. The mounting hole 23, which is a hole that is bored-out along the axial center, is provided in the front half portion of the wood shaft 20. As shown in FIG. 20 that is the H-H cross-section of FIG. 19, the wood shaft 20 presents a hexagonal cross-section like a pencil, and the mounting hole 23 is formed in the axial center thereof.

The input body 30 of the input pen 10 of FIG. 15 is similar to that of the above-described first embodiment. This input body 30 is inserted into the mounting hole 23 (see FIG. 19) of the wood shaft 20 shown in FIG. 18, and this becomes the electromagnetic induction type input pen 10 shown in FIG. 15. A drawing showing this input pen 10 in the I-I cross-section of FIG. 15, FIG. 16 and FIG. 17 is FIG. 21. Note that the internal structure of the input body 30 is omitted from FIG. 21. The majority of the input body 30 is accommodated in the mounting hole 23, and only the distal end portion that includes the contacting distal end 42 projects out from the distal end of the wood shaft 20. Note that the tail cap 22 is mounted so as to cover the reduced diameter portion 24 of the rear end of the wood shaft 20.

Figure 21:
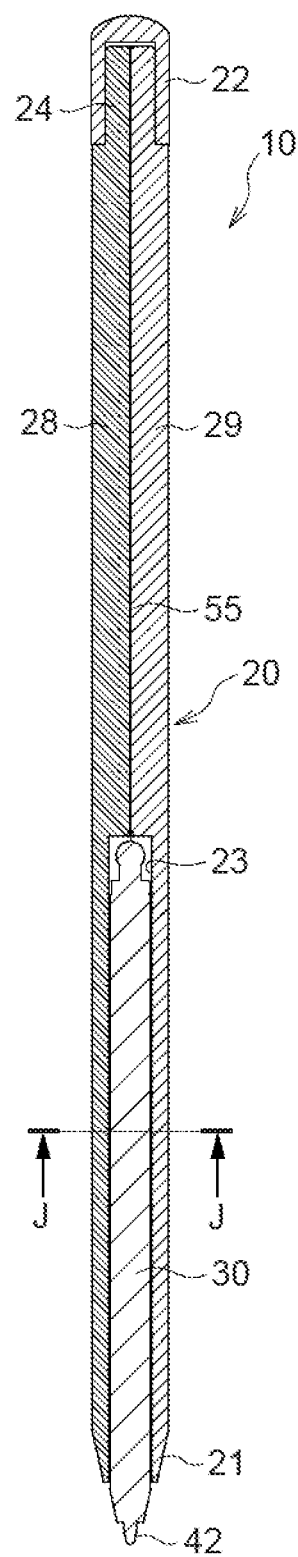
FIG. 21 is an I-I cross-sectional view of FIG. 15, FIG. 16 and FIG. 17.
Figure 22:
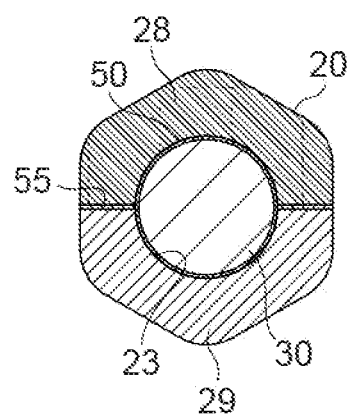
FIG. 22 is a J-J cross-sectional view of FIG. 21.

FIG. 22 shows the J-J cross-section of FIG. 21. Note that the internal structure of the input body 30 is omitted. As described above, the wood shaft members 28, 29 that structure the wood shaft 20 present a hexagonal cross-section on the whole, via the affixing agent 55 that affixes them together. Further, the binding agent 50 is interposed between the inner side surface of the mounting hole 23 of the wood shaft 20 and the outer side surface of the input body 30. The binding agent 50 is similar to that of the above-described first embodiment.

Here, because electronic parts are built into the input body 30 as described above, there is the concern that, if the input body 30 is mounted into the mounting hole 23 by being press-fit therein, this will damage the electronic parts, and there is the possibility of bringing about problems in usage of the input pen 10. Therefore, in the present embodiment, the inner diameter of the mounting hole 23 is a length of an extent such that the input body 30 can be inserted therein without being press-fit, or, in other words, is a length of an extent such that the input body 30 is fit-in with play.

Further, by fitting the input body 30 in with play after the binding agent 50 has been applied to the inner side surface of the mounting hole 23, it is possible to mount the input body 30 to the wood shaft 20 without excessive force being applied to the input body 30, and, at the same time, the wood shaft 20 is not damaged at the time of mounting. If the binding agent 50 solidifies after the input body 30 is mounted, the input body 30 is completely bonded to the mounting hole 23, and will not fall-out during use.

The structure of the input body 30, the state of usage of the input pen 10, and the significance of using the wood shaft 20 also are similar to those of the above-described first embodiment.

Fourth Embodiment

Figure 23:
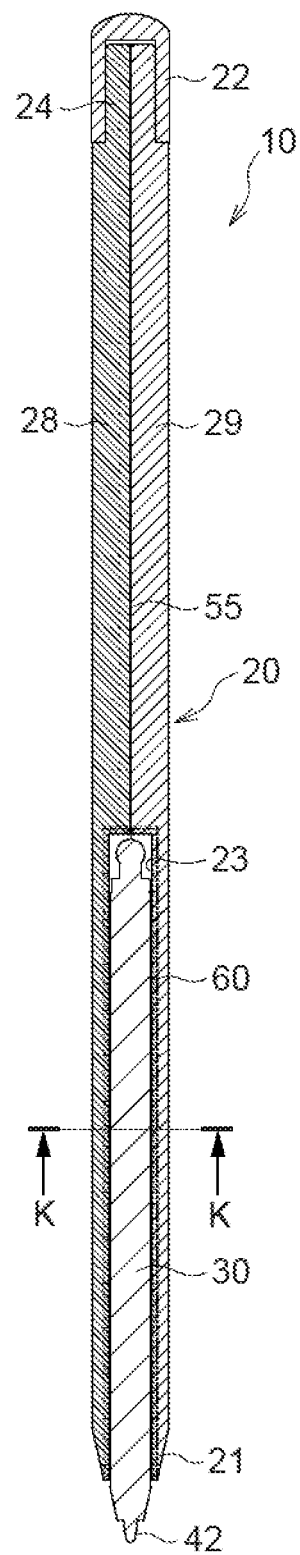
FIG. 23 shows the input pen relating to a fourth embodiment in a front sectional view.

FIG. 23 shows the input pen 10 relating to the fourth embodiment in a front sectional view. The external appearance of the input pen 10 relating to the present embodiment is similar to that of the third embodiment (see FIG. 15), but the fourth embodiment differs from the third embodiment with regard to the point that the reinforcing resin 60 is made to seep into the inner side surface of the mounting hole 23 of the wood shaft 20. This reinforcing resin 60 is similar to that of the above-described second embodiment. By applying such a reinforcing resin 60 to the inner side surface of the mounting hole 23 and leaving it for a predetermined period of time, the reinforcing resin 60 solidifies in a state of having seeped into the wood material in the vicinity of the inner side surface of the mounting hole 23 as shown in FIG. 23, and, due thereto, the inner side surface of the mounting hole 23 is reinforced. Therefore, the strength of the thin-walled portions such as the taper portion 21 of the wood shaft 20 increases, and the possibility of damage at the time of mounting the input body 30 or during use can be reduced.

Figure 24:
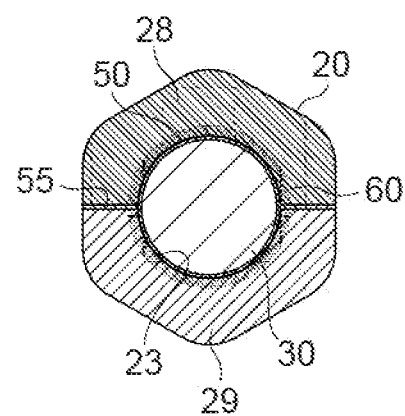
FIG. 24 is a K-K cross-sectional view of FIG. 23.

Note that, in the present embodiment as well, as shown in FIG. 24 that is the K-K cross-sectional view of FIG. 23, the binding agent 50 is interposed between the inner side surface of the mounting hole 23 of the wood shaft 20 and the outer side surface of the input body 30. The significance of this binding agent 50 is similar to that of the above-described first embodiment. In the present embodiment, because a layer in which the reinforcing resin 60 has seeped exists at the inner side surface of the mounting hole 23, the strength of the wood shaft 20 increases more so than in the above-described third embodiment.

The structure of the input body 30, the state of usage of the input pen 10, and the significance of using the wood shaft 20 are similar to those of the above-described first embodiment.

Fifth Embodiment

Figure 25:
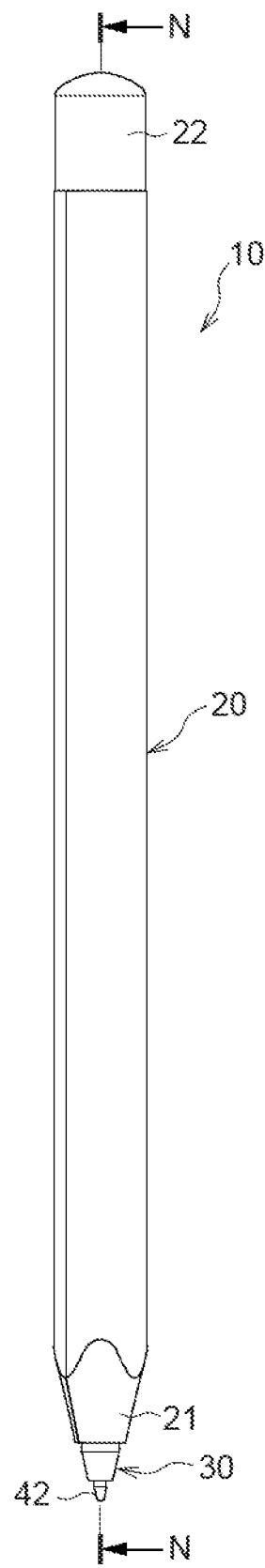
FIG. 25 is a front view showing the external appearance of the input pen of a fifth embodiment.
Figure 26:
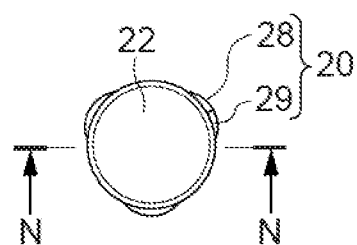
FIG. 26 is a plan view of the input pen of FIG. 25.

As shown in the front view of FIG. 25, the plan view of FIG. 26 and the bottom view of FIG. the input pen 10 relating to the fifth embodiment of the present invention presents an external appearance in which the contacting distal end 42 of the input body 30 projects out from the distal end of the pencil-like wood shaft 20 that is equilateral triangular in cross-section. The distal end of the wood shaft 20 is the taper portion 21 that is cut in a tapered form. Further, the tail cap 22, which is cylindrical tube shaped and whose rear end is formed as a spherical surface, is mounted to the rear end of the wood shaft 20. The side surfaces of the wood material that is the material of the wood shaft 20 are coated for the purposes of protecting the surfaces, and reinforcement and decoration.

Figure 28:
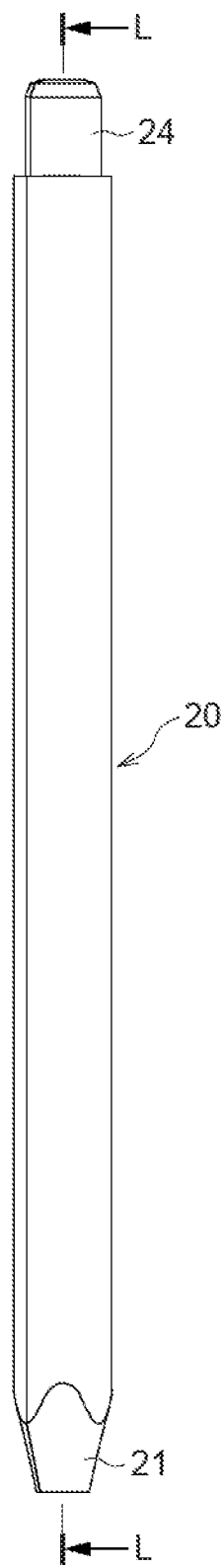
FIG. 28 is a front view of the wood shaft at the input pen of FIG. 25.

FIG. 28 is a front view of the wood shaft 20 at the input pen of FIG. 25. The distal end of the wood shaft 20 is the taper portion 21 that is cut in a tapered form as described above. The rear end of the wood shaft 20 is formed in the shape of a cylindrical tube whose outer diameter is reduced, and this portion is the reduced diameter portion 24 to which the above-described tail cap 22 is mounted.

Figure 29:
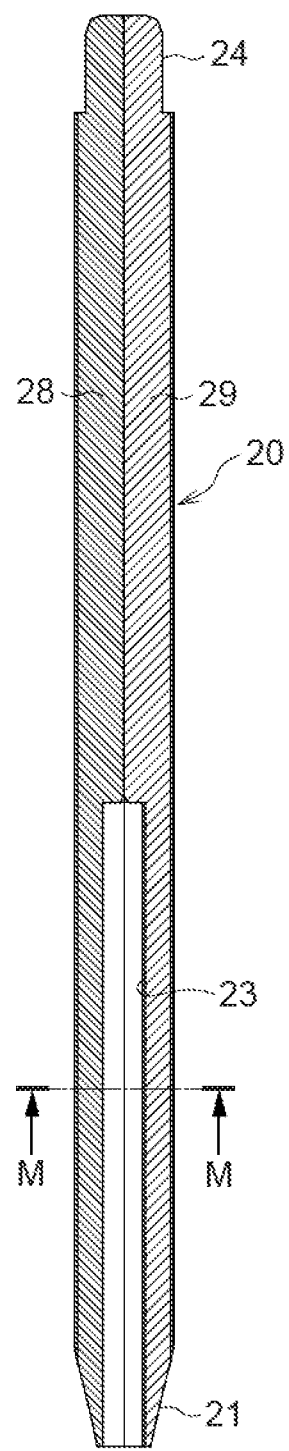
FIG. 29 is an L-L cross-sectional view of the wood shaft of FIG. 28.
Figure 30:
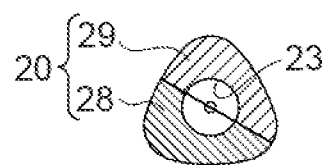
FIG. 30 is an M-M cross-sectional view of the wood shaft of FIG. 29.

FIG. 29 shows the wood shaft 20 of FIG. 28 in an L-L cross-section. In the present embodiment, the wood shaft 20 is formed by two members, i.e., the wood shaft members 28, 29, being affixed together by the affixing agent 55. These wood shaft members 28, 29 are usually formed of the same tree species, but wood materials of different tree species may be used. This affixing agent 55 is similar to that of the above-described third embodiment. The mounting hole 23, which is a hole that is bored-out along the axial center, is provided in the front half portion of the wood shaft 20. As shown in FIG. 30 that is the M-M cross-section of FIG. 29, the wood shaft 20 presents an equilateral triangular cross-section, and the mounting hole 23 is formed in the axial center thereof.

Figure 27:
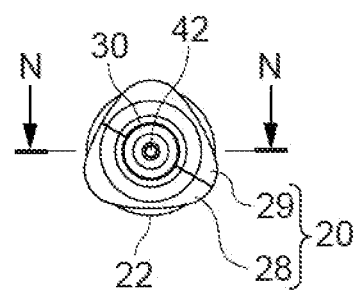
FIG. 27 is a bottom view of the input pen of FIG. 25.

The input body 30 of the input pen 10 of FIG. 25 is similar to that of the above-described first embodiment. This input body 30 is inserted into the mounting hole 23 (see FIG. 29) of the wood shaft 20 shown in FIG. 28, and this becomes the electromagnetic induction type input pen 10 shown in FIG. 25. A drawing showing this input pen 10 in the N-N cross-section of FIG. 25, FIG. 26 and FIG. 27 is FIG. 31. Note that the internal structure of the input body 30 is omitted from FIG. 31. The majority of the input body 30 is accommodated in the mounting hole 23, and only the distal end portion that includes the contacting distal end 42 projects out from the distal end of the wood shaft 20. Note that the tail cap 22 is mounted so as to cover the reduced diameter portion 24 of the rear end of the wood shaft 20.

Figure 31:
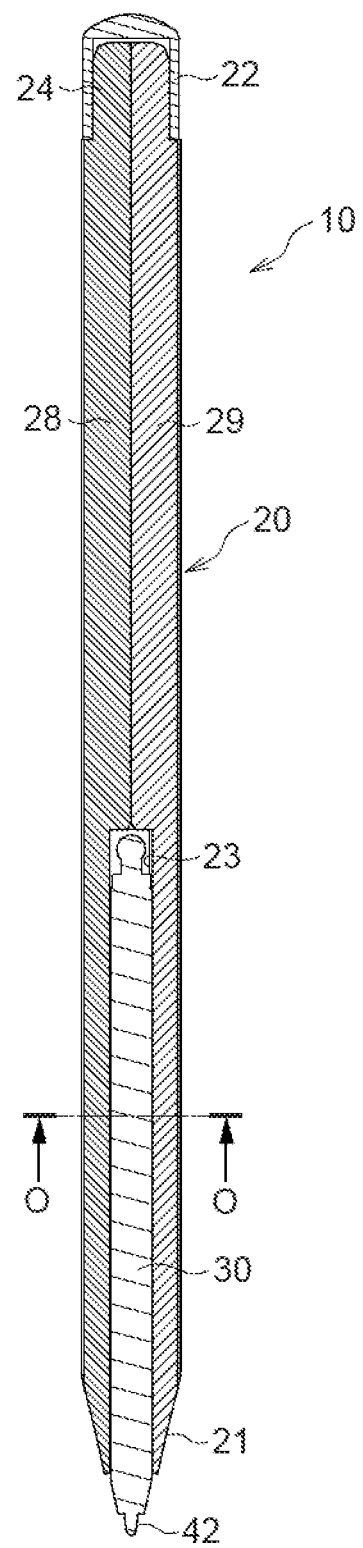
FIG. 31 is an N-N cross-sectional view of FIG. 25, FIG. 26 and FIG. 27.
Figure 32:
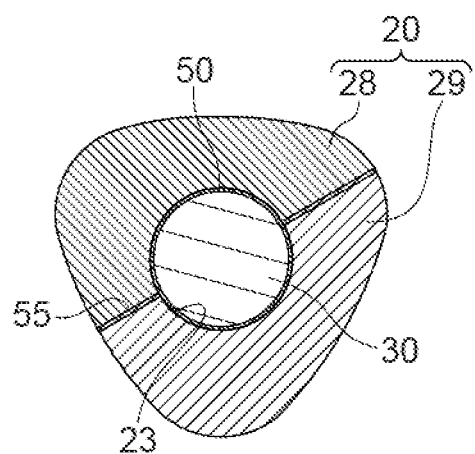
FIG. 32 is an O-O cross-sectional view of FIG. 31.

FIG. 32 shows the O-O cross-section of FIG. 31. Note that the internal structure of the input body 30 is omitted. As described above, the wood shaft members 28, 29 that structure the wood shaft 20 present an equilateral triangular cross-section on the whole, via the affixing agent 55 that affixes them together. Further, the binding agent 50 is interposed between the inner side surface of the mounting hole 23 of the wood shaft 20 and the outer side surface of the input body 30. The binding agent 50 is similar to that of the above-described first embodiment.

Here, because electronic parts are built into the input body 30 as describes above, there is the concern that, if the input body 30 is mounted into the mounting hole 23 by being press-fit therein, this will damage the electronic parts, and there is the possibility of bringing about problems in usage of the input pen 10. Therefore, in the present embodiment, the inner diameter of the mounting hole 23 is a length of an extent such that the input body 30 can be inserted therein without being press-fit, or, in other words, is a length of an extent such that the input body 30 is fit-in with play.

Further, by fitting the input body 30 in with play after the binding agent 50 has been applied to the inner side surface of the mounting hole 23, it is possible to mount the input body 30 to the wood shaft 20 without excessive force being applied to the input body 30, and, at the same time, the wood shaft 20 is not damaged at the time of mounting. If the binding agent 50 solidifies after the input body 30 is mounted, the input body 30 is completely bonded to the mounting hole 23, and will not fall-out during use.

The structure of the input body 30, the state of usage of the input pen 10, and the significance of using the wood shaft 20 also are similar to those of the above-described first embodiment.

Sixth Embodiment

Figure 33:
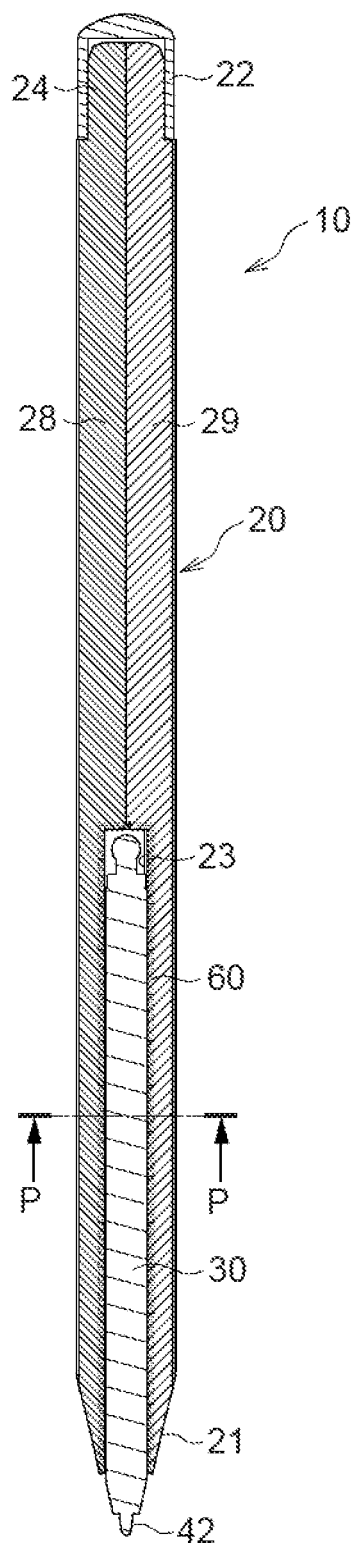
FIG. 33 shows the input pen relating to a sixth embodiment in a front sectional view.

FIG. 33 shows the input pen 10 relating to the sixth embodiment in a front sectional view. The external appearance of the input pen 10 relating to the present embodiment is similar to that of the fifth embodiment (see FIG. 25), but the sixth embodiment differs from the fifth embodiment with regard to the point that the reinforcing resin 60 is made to seep into the inner side surface of the mounting hole 23 of the wood shaft 20. This reinforcing resin 60 is similar to that of the above-described second embodiment. By applying such a reinforcing resin 60 to the inner side surface of the mounting hole 23 and leaving it for a predetermined period of time, the reinforcing resin 60 solidifies in a state of having seeped into the wood material that is in the vicinity of the inner side surface of the mounting hole 23 as shown in FIG. 33, and, due thereto, the inner side surface of the mounting hole 23 is reinforced. Therefore, the strength of the thin-walled portions such as the taper portion 21 of the wood shaft 20 increases, and the possibility of damage at the time of mounting the input body 30 or during use can be reduced.

Figure 34:
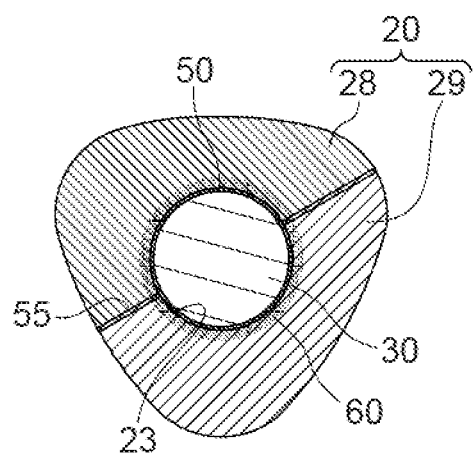
FIG. 34 is a P-P cross-sectional view of FIG. 33.

Note that, in the present embodiment as well, as shown in FIG. 34 that is the P-P cross-sectional view of FIG. 33, the binding agent 50 is interposed between the inner side surface of the mounting hole 23 of the wood shaft 20 and the outer side surface of the input body 30. The significance of this binding agent 50 is similar to that of the above-described first embodiment. In the present embodiment, because a layer in which the reinforcing resin 60 has seeped exists at the inner side surface of the mounting hole 23, the strength of the wood shaft 20 increases more so than in the above-described fifth embodiment.

The structure of the input body 30, the state of usage of the input pen 10, and the significance of using the wood shaft 20 are similar to those of the above-described first embodiment.

Seventh Embodiment

Figure 35:
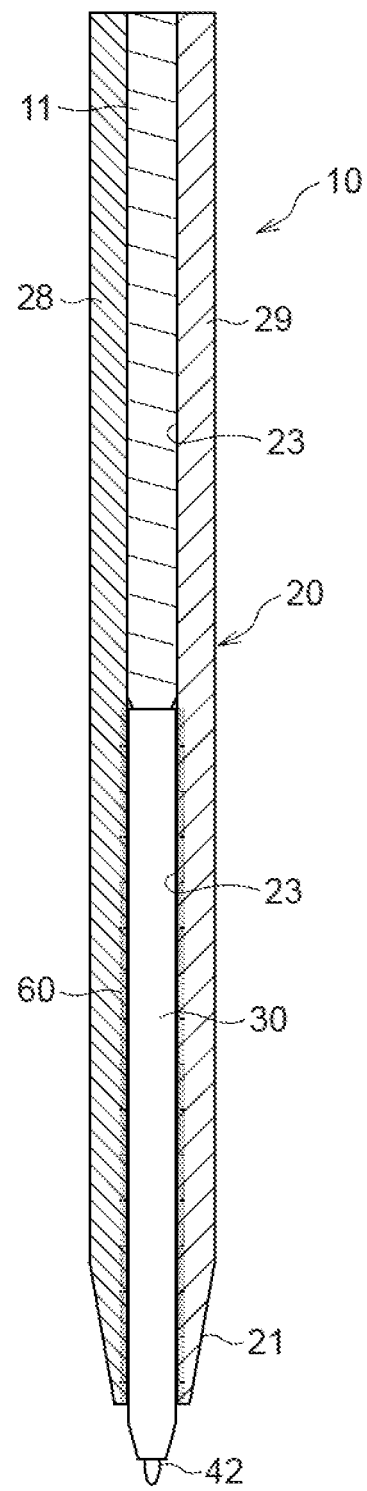
FIG. 35 shows the input pen relating to a seventh embodiment in a front sectional view.

FIG. 35 shows the input pen 10 relating to the seventh embodiment in a front sectional view. In the present embodiment, the mounting hole 23 of the wood shaft 20, which is formed by the two wood shaft members 28, 29 being affixed together, passes through from the distal end to the rear end. Therefore, a so-called slat on a production line of usual pencils can be applied to the manufacturing of this wood shaft 20. Note that the affixing agent 55 that is involved in the affixing of the wood shaft members 28, 29 is similar to that of the above-described third embodiment.

A rear end spacer 11 that is solid cylindrical is inserted in the rear half portion of this mounting hole 23. A rod of a material that is easy to adhere is desirably used as the material of this rear end spacer 11. Examples of easily adhered materials are, for example, resins such as ABS, polystyrene and the like, metals such as stainless steel and the like, ceramics, carbon cores, concrete and the like. Further, in the same way as in the above-described respective embodiments, the input body 30 is mounted in the front half portion of the mounting hole 23.

Note that the structure of the input body 30, the state of usage of the input pen 10, and the significance of using the wood shaft 20 are similar to those of the above-described first embodiment. Further, the binding of the input body 30 and the mounting hole 23 by the binding agent 50 also is similar to the above-described first embodiment. Moreover, the seeping of the reinforcing resin 60 into the inner side surface of the mounting hole 23 is similar to the above-described second embodiment.

Eighth Embodiment

Figure 36:
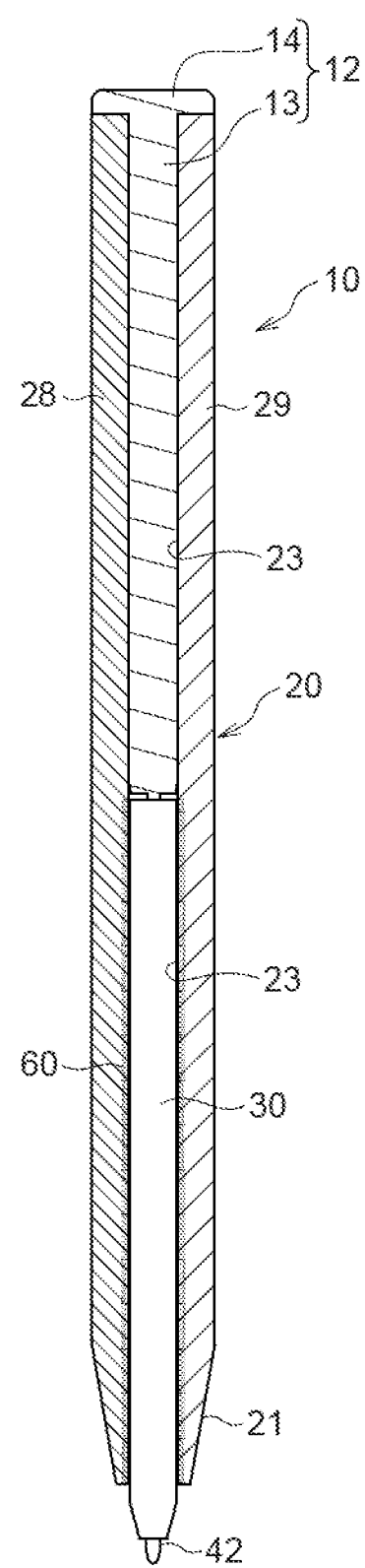
FIG. 36 shows the input pen relating to an eighth embodiment in a front sectional view.

FIG. 36 shows the input pen 10 relating to the eighth embodiment in a front sectional view. In the present embodiment, in the same way as in the above-described seventh embodiment, the mounting hole 23 of the wood shaft 20, which is formed by the two wood shaft members 28, 29 being affixed together, passes through from the distal end to the rear end. Therefore, a so-called slat on a production line of usual pencils can be applied to the manufacturing of this wood shaft 20. Note that the affixing agent 55 that is involved in the affixing of the wood shaft members 28, 29 is similar to that of the above-described third embodiment.

An end plug 12 is inserted in the rear half portion of this mounting hole 23. The end plug 12 is formed from a rear end inserted portion 13 that is inserted in the mounting hole 23, and a rear end covering portion 14 that abuts the rear end edge of the wood shaft 20 and covers it. The material of the end plug 12 is not particularly limited, but it is desirable to use a molded body that is made of a synthetic resin. Further, in the same way as in the above-described respective embodiments, the input body 30 is mounted in the front half portion of the mounting hole 23.

The structure of the input body 30, the state of usage of the input pen 10, and the significance of using the wood shaft 20 are similar to those of the above-described first embodiment. Further, the binding of the input body 30 and the mounting hole 23 by the binding agent 50 also is similar to the above-described first embodiment. Moreover, the seeping of the reinforcing resin 60 into the inner side surface of the mounting hole 23 is similar to the above-described second embodiment.

Ninth Embodiment

Figure 37:
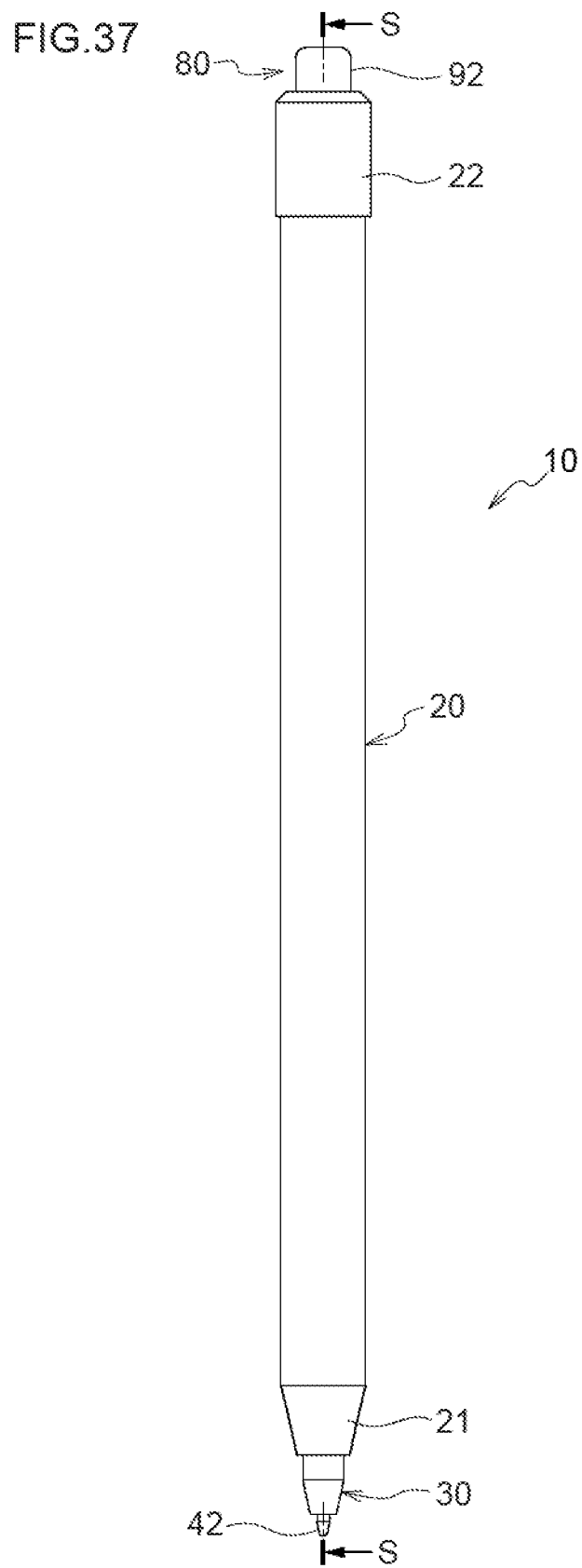
FIG. 37 is a front view showing the external appearance of the input pen of a ninth embodiment.
Figure 40:
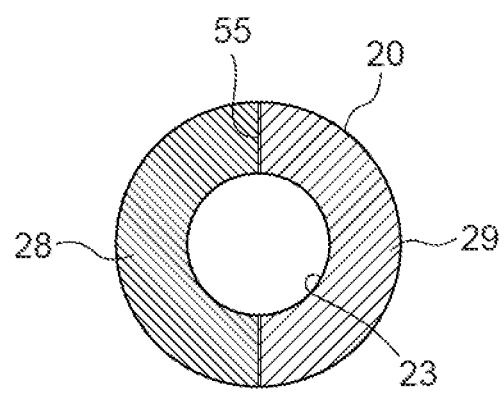
FIG. 40 is an R-R cross-sectional view of the wood shaft of FIG. 39.
Figure 41:
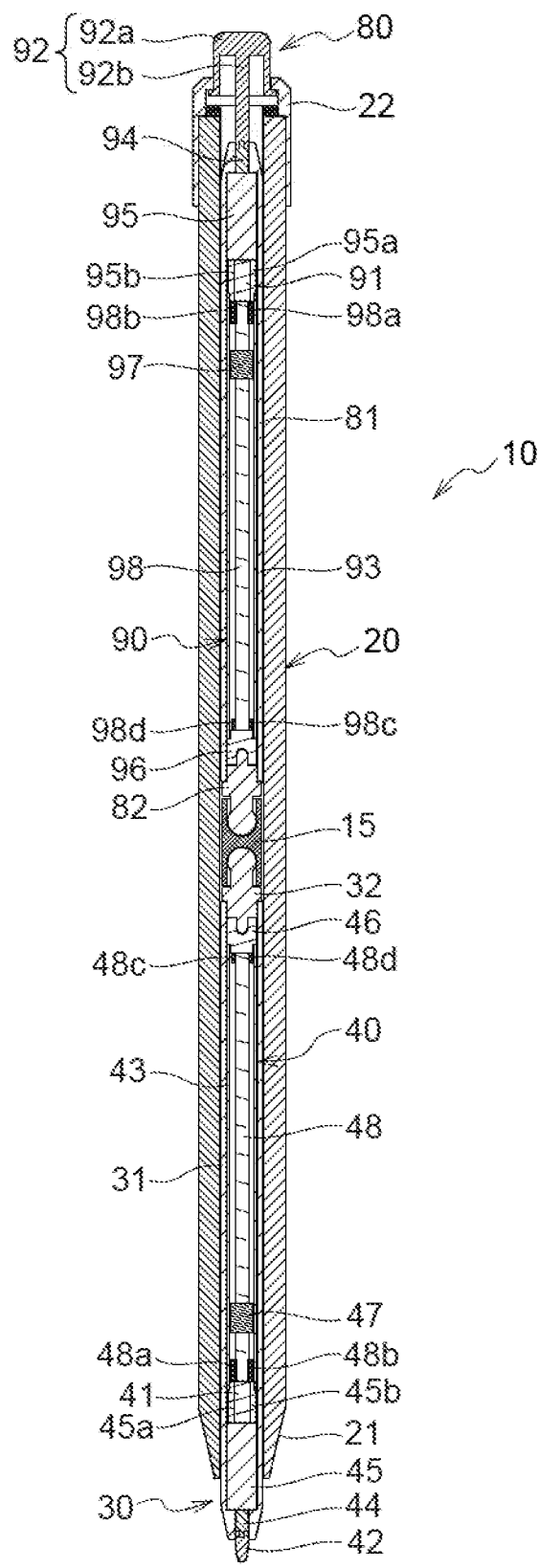
FIG. 41 is an S-S cross-sectional view of FIG. 37.

As shown in the front view of FIG. 37 and the cross-sectional view of FIG. 40, the input pen if relating to the ninth embodiment of the present invention presents an external appearance in which the contacting distal end 42 of the input body 30 projects out from one end side, i.e., the distal end, of the pencil-like wood shaft 20 that has a circular cross-section. The distal end of the wood shaft 20 is the taper portion 21 that is cut in a tapered form. Further, the tail cap 22 that is substantially cylindrical tube shaped is mounted to the another end side, i.e., the rear end, of the wood shaft 20, and, moreover, a contacting rear end 92 of a second input body 80 projects out from the rear end of the tail cap 22. The side surfaces of the wood material that is the material of the wood shaft 20 are coated for the purposes of protecting the surfaces, and reinforcement and decoration.

Figure 38:
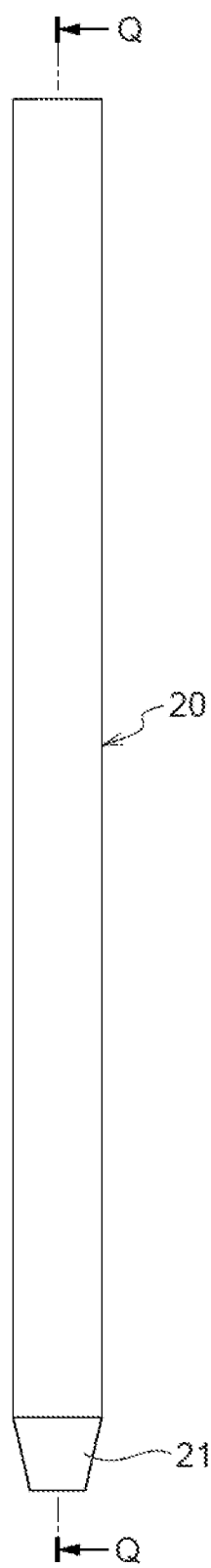
FIG. 38 is a front view of the wood shaft at the input pen of FIG. 37.

FIG. 38 is a front view of the wood shaft 20 at the input pen of FIG. 37. The distal end of the wood shaft 20 is the taper portion 21 that is cut in a tapered form as described above.

Figure 39:
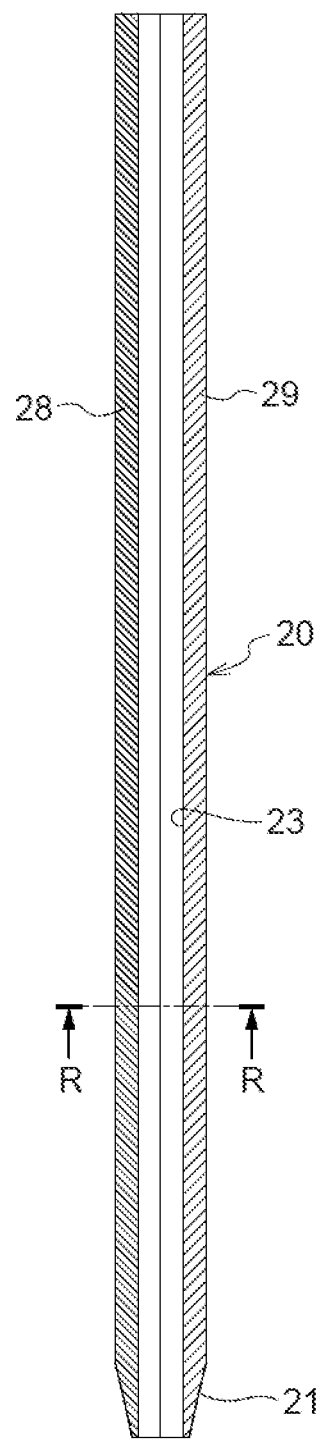
FIG. 39 is a Q-Q cross-sectional view of the wood shaft of FIG. 38.

FIG. 39 shows the wood shaft 20 of FIG. 38 in a Q-Q cross-section. In the present embodiment, the wood shaft 20 is formed by two members, i.e., the wood shaft members 28, 29, being affixed together by the affixing agent 55 (see FIG. 40). These wood shaft members 28, 29 are usually formed of the same tree species, but wood materials of different tree species may be used. An adhesive that can be used in adhering wood materials together, e.g., wood glue, can be used as this affixing agent 55. The mounting hole 23, which is a hole that passes through along the axial center from the distal end to the rear end, is provided in the wood shaft 20. As shown in FIG. 40 that is the R-R cross-section of FIG. 39, the wood shaft 20 presents a circular cross-section like a pencil, and the mounting hole 23 is formed in the axial center thereof.

The input body 30 that is mounted to the input pen 10 of FIG. 37 is similar to that of the above-described first embodiment. This input body 30 is inserted in the front half portion of the mounting hole 23 (see FIG. 39) of the wood shaft 20 shown in FIG. 38. The majority of the input body 30 is accommodated in the mounting hole 23, and only the distal end portion that includes the contacting distal end 42 projects out from the distal end of the wood shaft 20.

Note that the tail cap 22 is mounted so as to cover the reduced diameter portion 24 of the rear end of the wood shaft 20. The contacting rear end 92 of the second input body 80, which passes through this tail cap 22 and is inserted in the rear half portion of the mounting hole 23 of the wood shaft 20, projects out rearwardly. At the second input body 80, a second digitizer unit 90 that is described later is built into the interior of a second outer tube 81 that is tubular, and the aforementioned contacting rear end 92 projects out from the rear end. Further, a second supporting cap 82 is mounted to the distal end. The second outer tube 81 is formed of a polycarbonate ABS (PC/ABS) polymer alloy resin.

Figure 42:
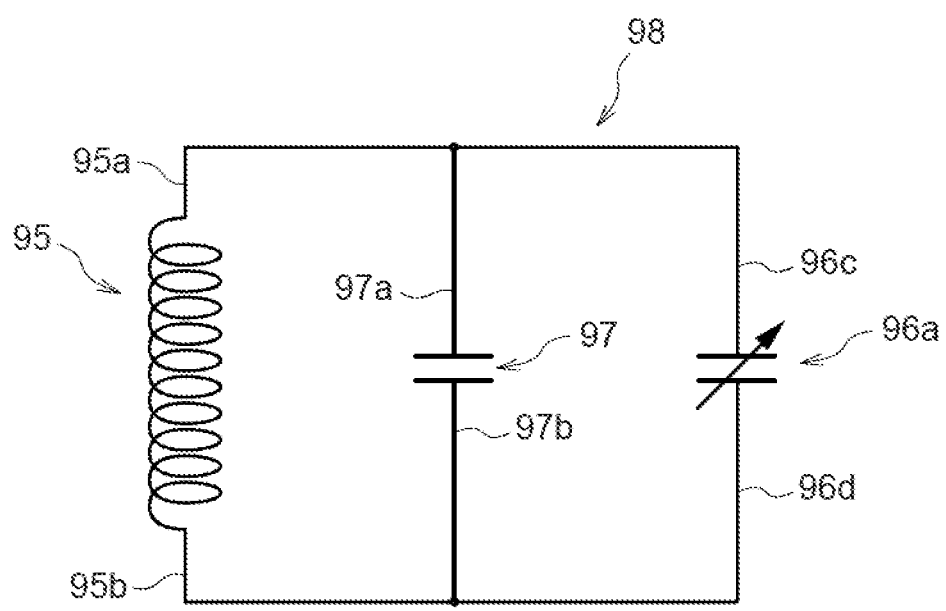
FIG. 42 is a circuit diagram of an electromagnetic induction coil at the input pen of FIG. 37.

The second digitizer unit 90 that is built in the second outer tube 81 has a structure in which a second ferrite core 94, which is rod-shaped and around which a second electromagnetic induction coil 95 is wound, is mounted via a rear end coupling 91 to the rear end of a second accommodating tube 93 in which is built a second circuit board 98 on which a second capacitor 97 is packaged, and further, a second writing pressure sensing section 96 in accordance with a second variable capacitance capacitor 96a is mounted to the distal end of this second accommodating tube 93. The contacting rear end 92 that is made of a synthetic resin is fixed to the rear end of the second ferrite core 94. The contacting rear end 92 has a contacting portion 92a that is shaped as a substantially cylindrical tube whose rear end is closed, and a connecting portion 92b that projects out from the inner surface of the rear end toward the distal end and is connected to the second ferrite core 94. Legs 97a, 97b of the second capacitor 97 are connected respectively to two rear end side terminals 98a, 98b by wiring of the second circuit board 98, and are also connected respectively to two distal end side terminals 98c, 98d. The rear end side terminals 98a, 98b are connected respectively to extension wires 95a, 95b of the both ends of the second electromagnetic induction coil 95. The distal end side terminals 98c, 98d are connected respectively to two legs 96c, 96d of a variable capacitance capacitor 96a (see FIG. 42) that is within the second writing pressure sensing section 96. This variable capacitance capacitor 96a detects, as variations in the electrostatic amount, the pressure that is applied by the writing pressure that is applied to the contacting rear end 92. The above-described second ferrite core 94, second electromagnetic induction coil 95, second variable capacitance capacitor 96a and second capacitor 97 are electronic parts that are built-in within the second input body 80, and form a parallel resonance circuit shown in FIG. 42 by the wiring of the second circuit board 98. Further, the second supporting cap 82 that supports the distal end of the second writing pressure sensing section 96 is mounted to the distal end of the second outer tube 81.

An internal coupling 15 that connects the supporting cap 32 of the input body 30 and the supporting cap 82 of the second input body 80 is built-in in the substantially intermediate portion of the mounting hole 23 of the wood shaft 20. Further, in the same way as in the above-described first embodiment, the binding agent 50 is interposed (see FIG. 11) between the inner side surface of the mounting hole 23 of the wood shaft 20 and the respective outer side surfaces of the input body 30 and the second input body 80. The binding agent 50 is similar to that of the above-described first embodiment.

Here, because electronic parts are built into the input body 30 and the second input body 80 as described above, there is the concern that, if the input body 30 and the second input body 80 are mounted into the mounting hole 23 by being press-fit therein, this will damage the electronic parts, and there is the possibility of bringing about problems in usage of the input pen 10. Therefore, in the present embodiment, the inner diameter of the mounting hole 23 is a length of an extent such that the input body 30 and the second input body 80 can be inserted therein without being press-fit, or, in other words, is a length of an extent such that the input body 30 and the second input body 80 are fit-in with play.

Further, by fitting the input body 30 and the second input body 80 in with play after the binding agent 50 has been applied to the inner side surface of the mounting hole 23, the input body 30 and the second input body 80 can be mounted to the wood shaft 20 without excessive force being applied thereto, and, at the same time, the wood shaft 20 is not damaged at the time of mounting. If the binding agent 50 solidifies after the input body 30 and the second input body 80 are mounted, the input body 30 and the second input body 80 are completely bonded to the mounting hole 23, and will not fill-out during use. Further, it is desirable to fill the binding agent 50 in between the mounting hole 23, and the input body 30 and the second input body 80.

At the input pen 10 of the present embodiment, the state of usage by the input body 30 is similar to that of the first embodiment, and is in accordance with FIG. 12. An unillustrated position detecting device, which periodically generates electromagnetic waves of a specific frequency, is provided at the lower surface of the input surface 71 of the input device 70. Further, when the top of the input strike 71 is traced like the drawn line 72 by the contacting distal end 42 of the input pen 10, the contacting distal end 42 is pressed. At this time, the parallel resonance circuit shown in FIG. 9 resonates due to the electromagnetic waves, and electricity that is generated at the electromagnetic induction coil 45 accumulates in the capacitor 47. Due to the input pen 10 transmitting the electromagnetic waves, which are generated by this electricity flowing through the electromagnetic induction coil 45, and the aforementioned position detecting device receiving these, the input device 70 recognizes the position at which this electromagnetic induction arises as coordinate information, and the drawn line 72 is thereby recorded as electronic data. Here, at the variable capacitance capacitor 46a, because the electric capacitance varies due to the pressing force of the contacting distal end 42, the frequency of the electromagnetic waves that are transmitted by the input pen 10 can be varied due thereto. Due to these variations in frequency being sensed by the aforementioned position detecting device, they can be recognized as various attributes relating to the drawn line 72. These various attributes can be, for example, the thickness and color of the drawn line 72.

On the other hand, the second input body 80 is used as an erasing unit for erasing information inputted by the input body 30. At this time, the rear end of the input pen 10 of the present embodiment is turned face down and is used in substantially the same way as in FIG. 12. Namely, when the top of the drawn line 72 that has already been inputted on the input surface 71 is traced by the contacting rear end 92 of the input pen 10, the contacting rear end 92 is pressed. At this time, the parallel resonance circuit shown in FIG. 42 resonates due to the electromagnetic waves, and electricity that is generated at the second electromagnetic induction coil 95 accumulates in the second capacitor 97. Due to the input pen 10 transmitting the electromagnetic waves that are generated due to this electricity flowing through the second electromagnetic induction coil 95, and the aforementioned position detecting device receiving these, the input device 70 recognizes the position at which this electromagnetic induction arises as coordinate information, and records it as electronic data expressing that the drawn line 72 has been erased.

Here, the contacting surface area of the contacting rear end 92 with the input surface 71 is formed to be larger than that of the contacting distal end 42, in consideration of the purpose of usage thereof that is the erasing of the drawn line 72. Note that, by the settings of the electronic parts at the interior of the second input body 80, the second input body 80 can also be made to handle, for example, the inputting of a thicker drawn line, or the inputting of a drawn line of a color that is different than the input body 30. At this time, in the same way as the case of the input body 30, the frequency of the electromagnetic waves that the input pen 10 transmits can be varied by the second variable capacitance capacitor 96a whose electric capacitance varies due to the pressing force of the contacting rear end 92. Due to the aforementioned position detecting device sensing these variations in frequency, they can be recognized as various attributes relating to the drawn line 72 (e.g., the thickness and color of the drawn line 72).

The significance of using of the wood shaft 20 at the input pen 10 is similar to that of the above-described first embodiment. Further, in the same way as in the above-described second embodiment, the reinforcing resin 60 may be made to seep into the inner side surface of the mounting hole 23 of the wood shaft 20.

Tenth Embodiment

Figure 43:
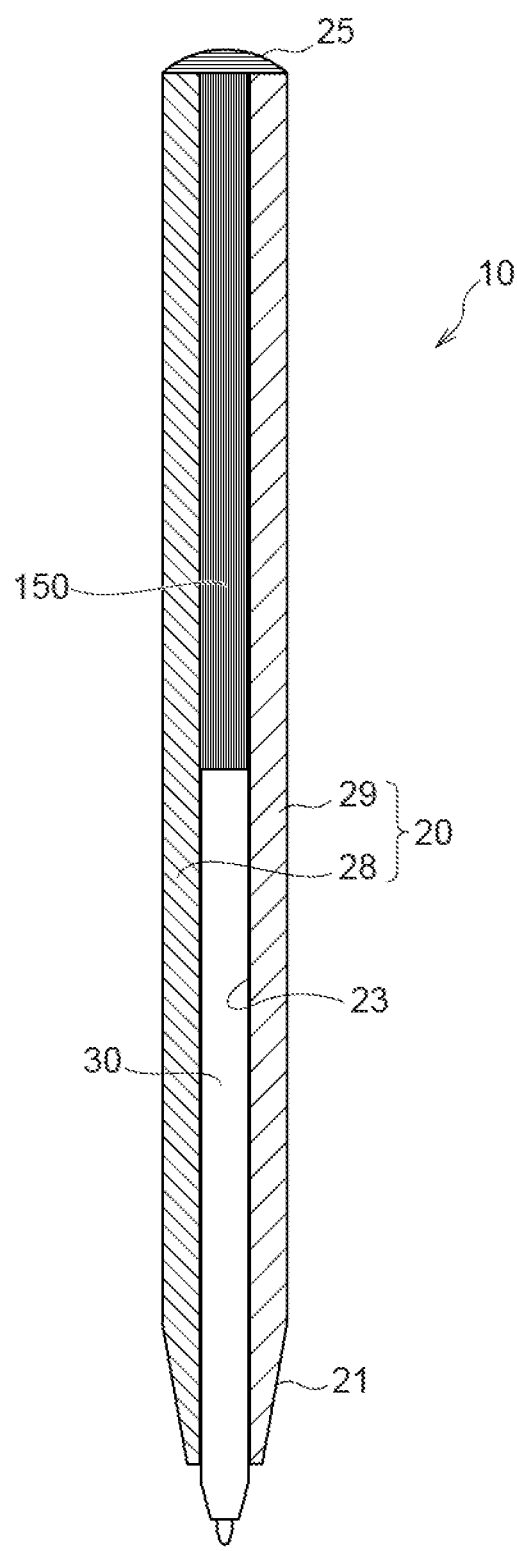
FIG. 43 shows the input pen relating to a tenth embodiment in a front sectional view.

As shown in the front sectional view of FIG. 43, at the input pen 10 relating to a tenth embodiment of the present invention, the input body 30 is mounted in the front half portion of the mounting hole 23 of the wood shaft 20 that is formed by the two wood shaft members 28, 29 being affixed together, and, on the other hand, a pencil lead 150 that serves as a rear end spacer is mounted in the rear half portion. Further, a convex portion 25, at which a coating is mounded-up so as to be convex rearwardly, is formed at the rear end of the wood shaft 20 in order to prevent dirtying due to the pencil lead 150 being exposed at the outer surface. For example, the function of an electrostatic capacitance type input pen can be imparted to the rear end side by using an electrically conductive coating as the coating for forming the convex portion 25. The distal end of the wood shaft 20 is the taper portion 21 that is cut in a tapered form.

A method of manufacturing the input pen 10 relating to the present embodiment is described with reference to the front sectional views of FIG. 44A through FIG. 44C, FIG. 45A through. FIG. 45C, and FIG. 46A through FIG. 46C. First, in the step shown in FIG. 44A, a groove 23a that is semicircular in cross-section is formed along the entire length in the length direction in the one wood shaft member 29 of the two members that structure the wood shaft 20. Note that, although not illustrated, the groove 23a that is semicircular in cross-section and is the same shape is formed in the another wood shaft member 28 as well. Therefore, a so-called slat on a production line of usual pencils can be applied as these wood shaft members 28, 29. Note that, in this state, thereafter, the reinforcing resin 60 such as described in the second embodiment may be made to seep into the inner peripheral surfaces of the grooves 23a that become the inner side surface of the mounting hole 23.

Figure 44A:
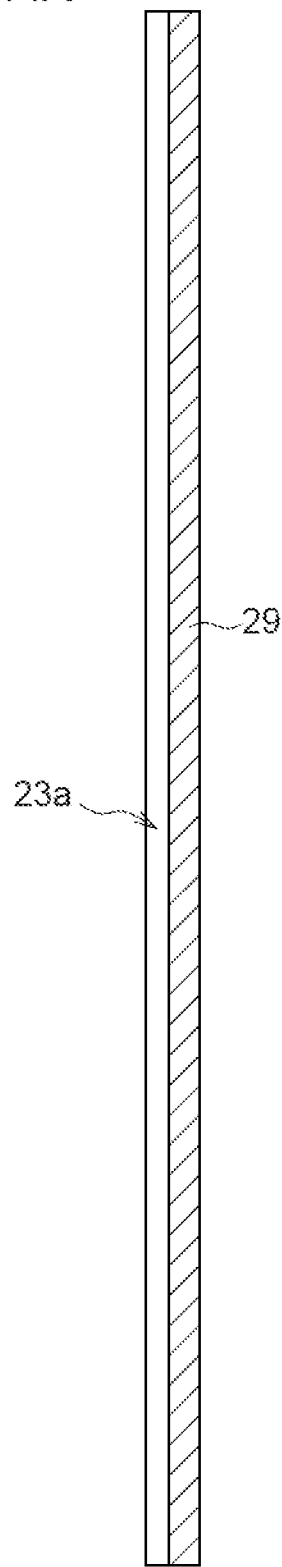
FIG. 44A shows a manufacturing step of the input pen of FIG. 43 in a front sectional view.
Figure 44B:
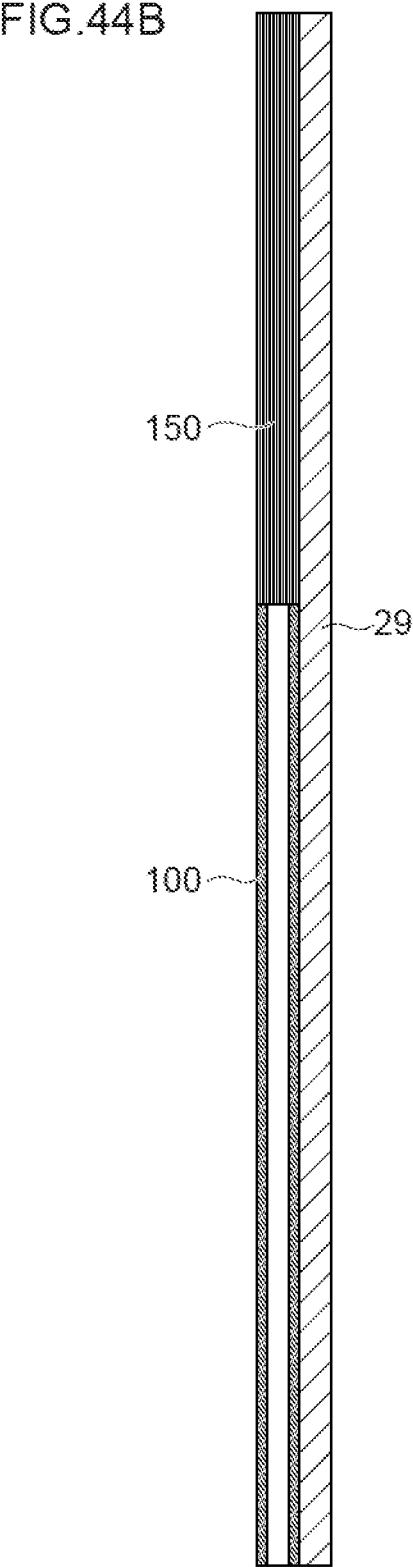
FIG. 44B shows a manufacturing step of the input pen of FIG. 43 in a front sectional view.

Then, in the step shown in FIG. 44B, in a state in which an unillustrated binding agent is coated on the surfaces of a synthetic resin rod 100 that is hollow and the pencil lead 150, the synthetic resin rod 100 is placed in the from half portion of the groove 23a, and the pencil lead 150 is placed in the rear half portion of the groove 23a. Note that, in the state in which the binding agent has been applied in advance to the groove 23a, the synthetic resin rod 100 that is made of polypropylene may be placed in the front half portion of the groove 23a, and the pencil lead 150 may be placed in the rear half portion of the groove 23a. Note that a rod that is solid, and not a rod that is hollow, may be used as the synthetic resin rod 100. Here, the binding agent is similar to the binding agent 50 described in the above-described first embodiment.

Figure 44C:
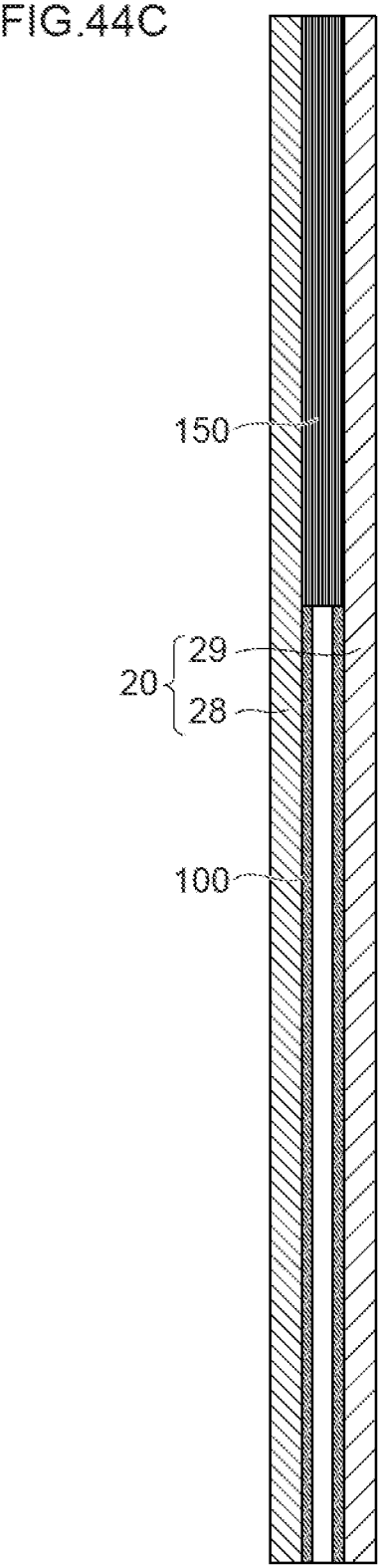
FIG. 44C shows a manufacturing step of the input pen of FIG. 43 in a front sectional view.

Next, in the step shown in FIG. 44C, the wood shaft 20 is formed by the another wood shaft member 28 being affixed to the one wood shaft member 29 such that the synthetic resin rod 100 and the pencil lead 150 are fit in the groove 23a of the another wood shaft member 28. Note that the affixing agent 55 that is involved in the affixing of these wood shaft members 28, 29 is similar to that of the above-described third embodiment.

Figure 45B:
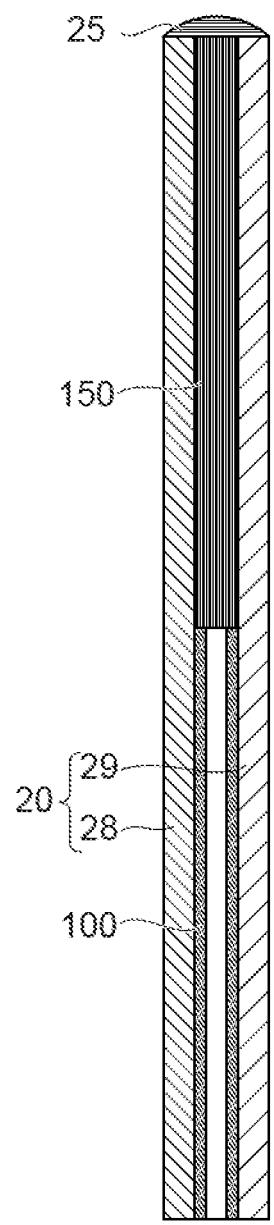
FIG. 45B shows a manufacturing step of the input pen of FIG. 43 in a front sectional view.
Figure 45C:
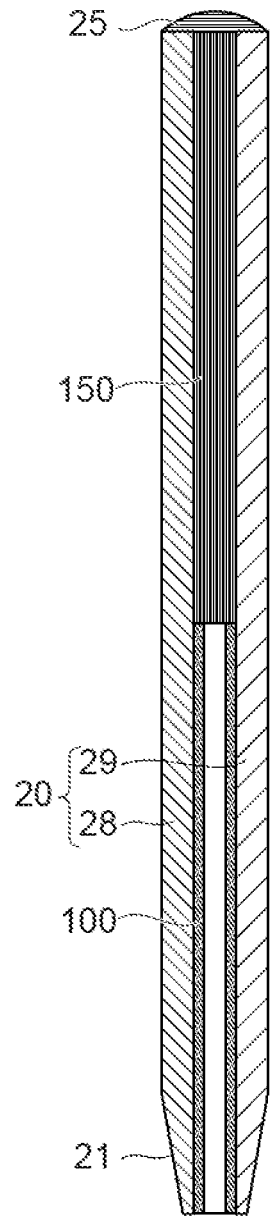
FIG. 45C shows a manufacturing step of the input pen of FIG. 43 in a front sectional view.

From this state, in the step shown in FIG. 45A, the convex portion 25, at which a coating is mounded-up as described above, is formed at the rear end of the wood shaft 20, and, in the step shown in FIG. 45B, the distal end portion of the wood shaft 20 is, together with the synthetic resin rod 100 built therein, cut-off so as to become a predetermined length. Moreover, in the step shown in FIG. 45C, the distal end portion of the wood shaft 20 is cut in a tapered form, and the taper portion 21 is formed.

Figure 46A:
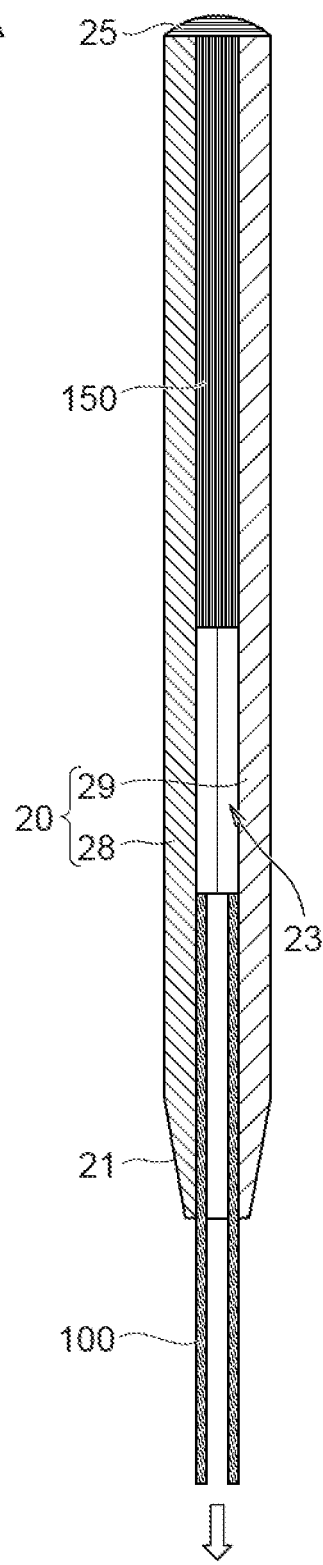
FIG. 46A shows a manufacturing step of the input pen of FIG. 43 in a front sectional view.
Figure 46C:
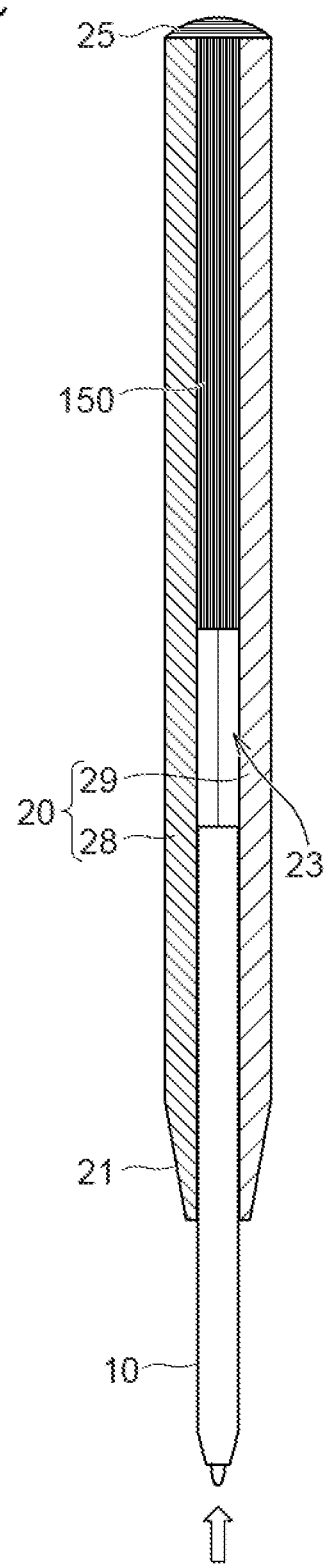
FIG. 46C shows a manufacturing step of the input pen of FIG. 43 in a front sectional view.

Further, from this state, in the step shown in FIG. 46A, the synthetic resin rod 100 is pulled-out for ward from the distal end of the wood shaft 20. As the method of pulling-out the synthetic resin rod 100, for example, after a tool at which a male screw such as a lug screw is formed is press-fit into the space of the distal end of the synthetic resin rod 100, the tool is pulled-out forward. However, an appropriate method other than this can be utilized.

After the synthetic resin rod 100 that is made of polypropylene is pulled-out, the mounting hole 23 is formed as shown in FIG. 46B. Then, in the step shown in FIG. 46C, in the same way as in the above-described first embodiment, an unillustrated binding agent is interposed between the input body 30 and the mounting hole 23, and due to the input body 30 being inserted in toward the rear side from the distal end of the wood shaft 20, the input pen 10 shown in FIG. 43 is completed. This input body 30 is similar to that of the above-described first embodiment.

Here, the material of the synthetic resin rod 100 is not limited to polypropylene, and a hard-to-adhere synthetic resin, which cannot be adhered by or is difficult to be adhered by a binding agent, is preferable. Examples of such a material are, for example, polyacetal, fluorine resins, silicone rubber, polyethylene, and the like.

Note that the above-described manufacturing method can be adapted to and used in the above-described other embodiments as well by omitting steps or changing parts or the like.

Eleventh Embodiment

Figure 47A:
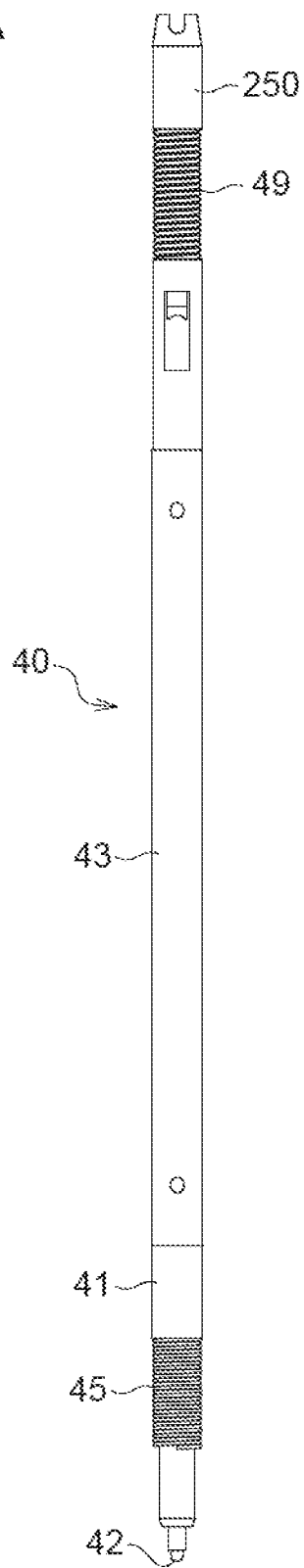
FIG. 47A shows a digitizer unit, which is used in the input pens of an eleventh embodiment and a twelfth embodiment, in a front view.
Figure 47B:
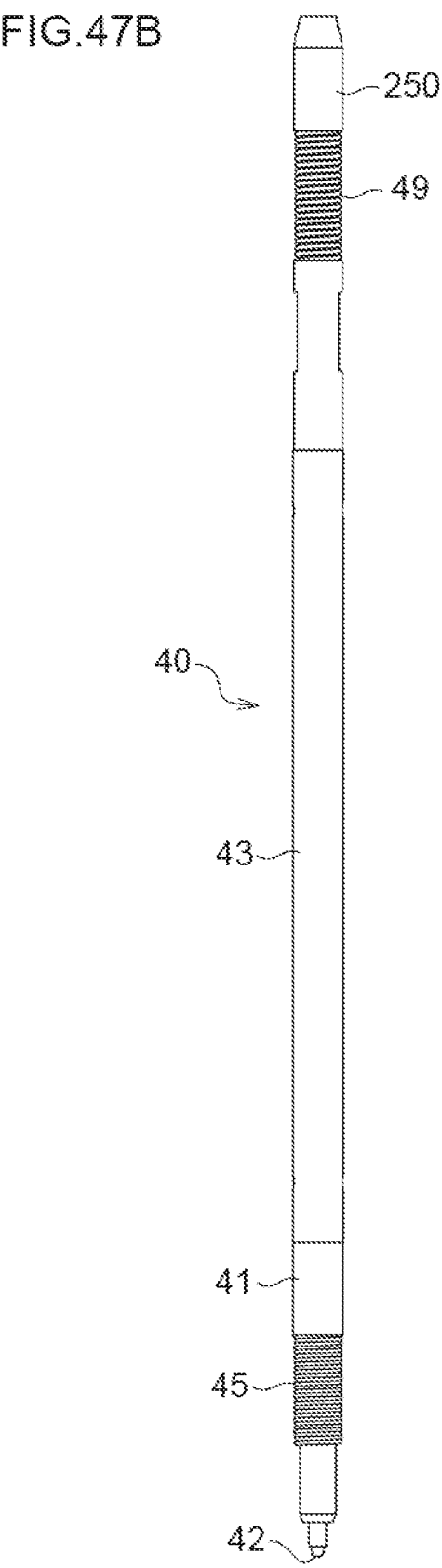
FIG. 47B shows the digitizer unit, which is used in the input pens of the eleventh embodiment and the twelfth embodiment, in a side view.

The digitizer unit 40, which is accommodated in the wood shaft 20 of the input pen 10 relating to the eleventh embodiment of the present invention, is structured as a refill that presents the outer appearance shown by the front view of FIG. 47A and the side view of FIG. 47B, and further, has the internal structure shown by the side sectional view of FIG. 47C.

As shown in FIG. 47A through FIG. 47C, the distal end coupling 41, which is made of a synthetic resin and has built therein the ferrite core 44 (see FIG. 47C) that is rod-shaped and positioned at the axial center, is mounted to the distal end of the accommodating tube 43 that is made of metal, and the contacting distal end 42 that is made of a synthetic resin is mounted to the distal end thereof. Further, the electromagnetic induction coil 45 is disposed in a state of being wound around the outer periphery of the ferrite core 44 with the distal end coupling 41 nipped therebetween. The writing pressure sensing section 46 and the capacitor 47 that are electrically connected to the electromagnetic induction coil 45 are accommodated within the accommodating tube 43 (see FIG. 47C). The writing pressure sensing section 46 is structured by a pressure-sensitive sensor. Further, the rear end of the accommodating tube 43 is a press-contact portion 250 that press-contacts an insertion restricting portion 240 that is described later. Moreover, a return spring 49 that urges the accommodating tube 43 in the distal end direction also is mounted. This return spring 49 is compressed at the time when the accommodating tube 43 moves rearward due to the pressing force of the distal end coupling 41. Further, when the contacting distal end 42 is pressed, the ferrite core 44 of the digitizer unit 40 also is pressed rearward. Due thereto, the writing pressure sensing section 46 enters into a contacting state. Namely, the writing pressure sensing section 46 senses the pressing force that is applied to the contacting distal end 42.

Figure 48:
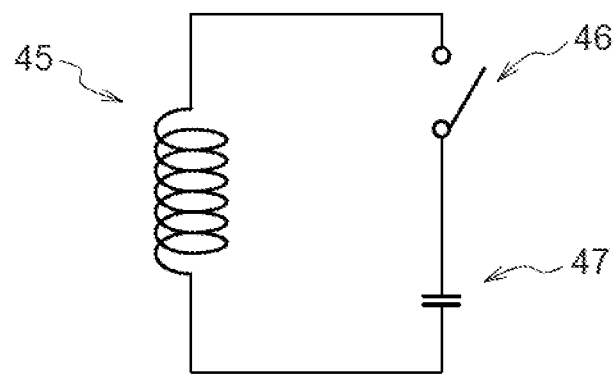
FIG. 48 is a circuit diagram of the electromagnetic induction coil of the digitizer unit of FIG. 47A through FIG. 47C.

The electromagnetic induction coil 45, the capacitor 47 and the writing pressure sensing section 46 form the circuit shown in FIG. 48, by unillustrated wiring. Here, when the writing pressure sensing section 46 contacts, the circuit of FIG. 48 is in a closed state.

Figure 49:
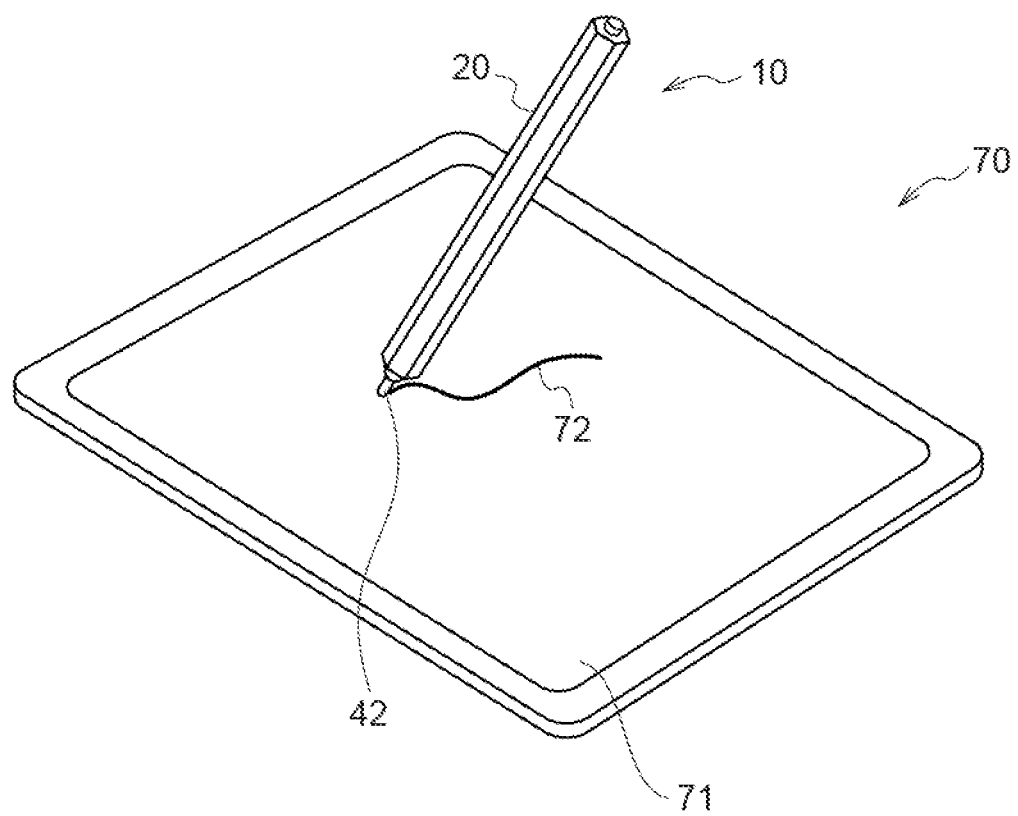
FIG. 49 is a perspective view that schematically shows a state of usage of the input pen that accommodates the digitizer unit of FIG. 47A through FIG. 47C.
Figure 50A:
FIG. 50A shows the wood shaft, which is used in the eleventh embodiment, in a front view.
Figure 50B:
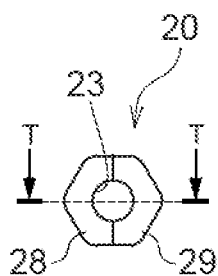
FIG. 50B shows the wood shaft, which is used in the eleventh embodiment, in a plan view.
Figure 50C:
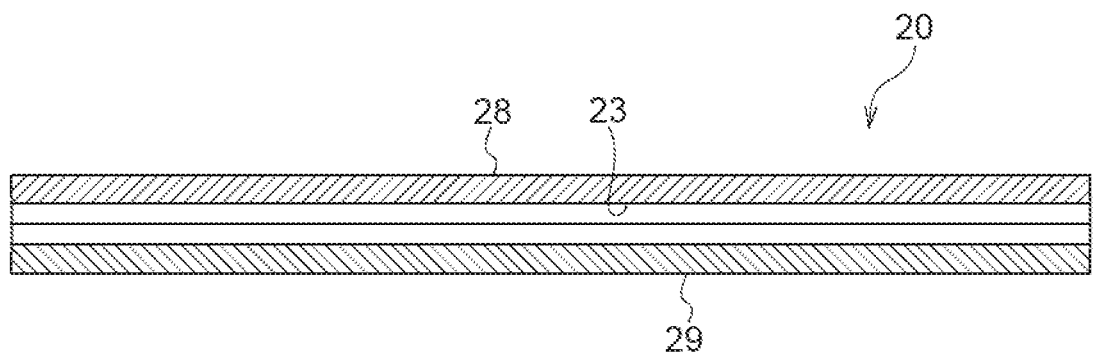
FIG. 50C shows the wood shaft, which is used in the eleventh embodiment, in a T-T cross-sectional view of FIG. 50B.
Figure 51:
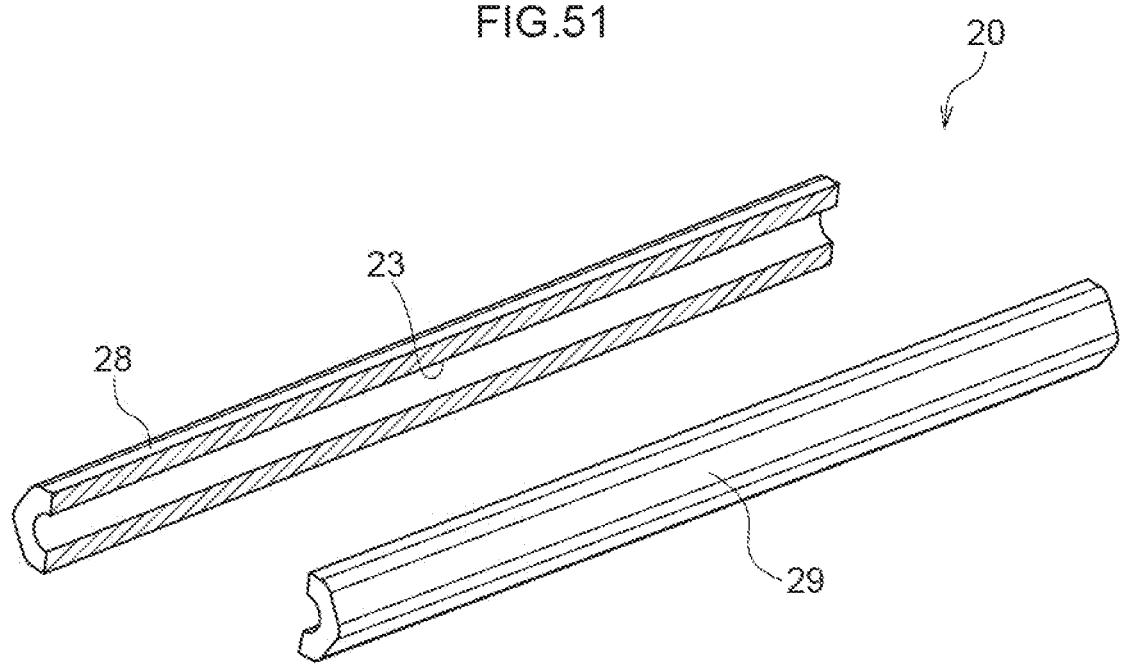
FIG. 51 shows the wood shaft of FIG. 50A through FIG. 50C in an assembly drawing.

FIG. 49 shows the state of usage of the input pen 10 of the respective embodiments. At the input pen 10, the digitizer unit 40 is accommodated in the wood shaft 20 that is described later, and the contacting distal end 42 projects out from the distal end of the wood shaft 20.

An unillustrated position detecting device, which generates electromagnetic waves of a specific frequency, is provided at the lower surface of the input surface 71 of the input device 70. Further, when the top of the input surface 71 is traced like the drawn line 72 by the contacting distal end 42 of the input pen 10, the contacting distal end 42 is pressed. When, due thereto, the circuit shown in FIG. 48 enters into a closed state, current flows to the circuit due to electromagnetic induction. Due to the input device 70 sensing the position, at which the electromagnetic induction arises, as coordinate information, the drawn line 72 is recorded as electronic data.

Note that, when the pressing force toward the contacting distal end 42 is released, due to the restoring force of the return spring 49, the ferrite core 44 also returns forward, and the contact of the writing pressure sensing section 46 is cancelled, and the circuit of FIG. 48 enters into an open state.

The structure of the wood shaft 20 that is used in the eleventh embodiment is described with reference to FIG. 50A, FIG. 50B, FIG. 50C and FIG. 51. As shown in the plan view of FIG. 50B, the wood shaft 20 presents a pillar-shaped structure of a hexagonal cross-section, and is formed by the wood shaft members 28, 29, which are divided in two along the length direction, being affixed together as shown in the assembly drawing of FIG. 51. A through-hole, which has a circular cross-section due to grooves which are semicircular in cross-section and are bored in the respective wood shaft members 28, 29 being superposed on one another, is formed in the interior of the wood shaft 20, and this is the mounting hole 23 that accommodates the digitizer unit 40 at the axial center of the wood shaft 20. The wood shaft 20 is formed to be a size that is similar to that of the wood shaft of an ordinary pencil.

Note that the material of the wood shaft 20 and the significance of using the wood shaft 20 are similar to those of the above-described first embodiment.

Various types of inserted members 200 are inserted into the mounting hole 23 of the wood shaft 20 from the rear end. Several examples thereof are given hereinafter.

Figure 52:
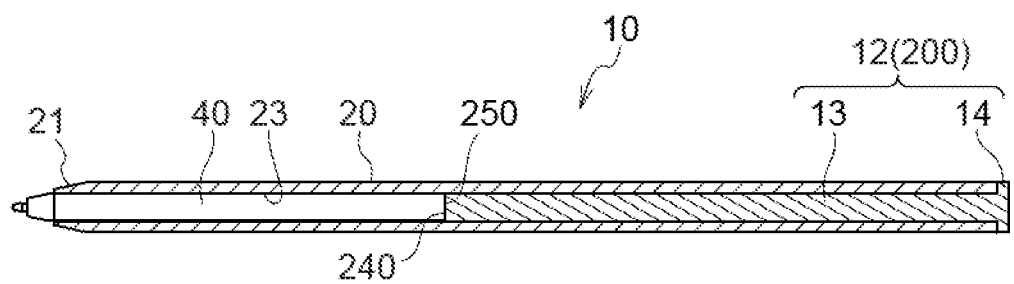
FIG. 52 shows a first example of the eleventh embodiment in a partial side sectional view.

FIG. 52 shows a first example of the input pen 10 relating to eleventh embodiment in a partial sectional side view. The end plug 12 that serves as the inserted member 200 is inserted into the mounting hole 23 of the wood shaft 20 from the rear end. The end plug 12 is structured by the rear end inserted portion 13 that is solid cylindrical and is inserted in the mounting hole 23, and the rear end covering portion 14 that is formed integrally with the rear end of the rear end inserted portion 13 and that press-contacts and is anchored on the rear end edge of the wood shaft 20. The distal end of the rear end inserted portion 13 reaches a portion midway along the wood shaft 20, and the distal end edge thereof is the insertion restricting portion 240. On the other hand, the digitizer unit 40 is inserted in from the distal end of the mounting hole 23. Note that, in the respective drawings that are described from hereon including the present drawing, at the digitizer unit 40, the structures of the respective portions that were described in detail in FIG. 47A through FIG. 47C are illustrated in a simplified manner.

The press-contact portion 250 that is provided at the rear end of the digitizer unit 40 press-contacts the insertion restricting portion 240 of the distal end edge of the rear end inserted portion 13. Namely, the insertion restricting portion 240 demarcates the insertion limit of the digitizer unit 40. Note that the distal end of the wood shaft 20 is the taper portion 21 that is cut in a tapered form, and it is easy to see the distal end of the digitizer unit 40 at the time of using the input pen 10.

In the present example, even if the length of the wood shaft 20 is not machined precisely, positioning of the rear end of the digitizer unit 40 at the interior of the wood shaft 20 is possible by appropriately cutting and shortening the distal end of the rear end inserted portion 13 of the end plug 12.

In the state shown in FIG. 52, between the outer peripheral surface of the digitizer unit 40 and the inner peripheral surface of the mounting hole 23, the digitizer unit 40 can be taken-out and put-in, and frictional force of an extent such that the digitizer unit 40 does not fall out naturally even if the digitizer unit 40 is turned face down in a state of being inserted in the wood shaft 20, is applied. This can be realized by adjusting the respective diameters of the digitizer unit 40 and the mounting hole 23. Or, this may be realized by adjusting the respective surface roughnesses of the outer peripheral surface of the digitizer unit 40 and the inner peripheral surface of the mounting hole 23.

Figure 53:
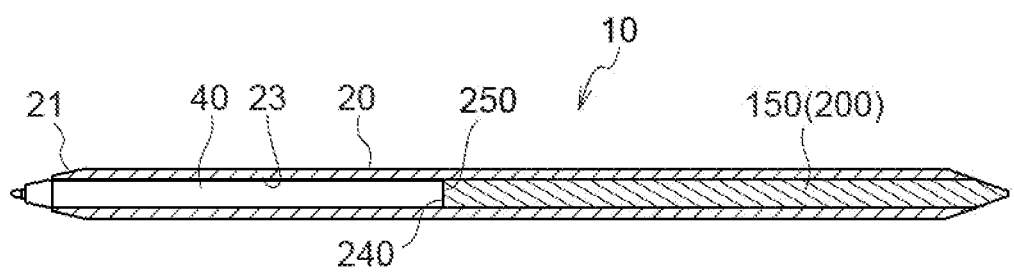
FIG. 53 shows a second example of the eleventh embodiment in a partial side sectional view.
Figure 57B:
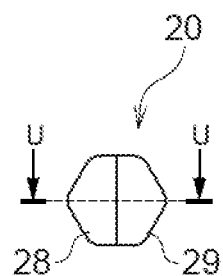
FIG. 57B shows the wood shaft, which is used in the twelfth embodiment, in a plan view.
Figure 57C:
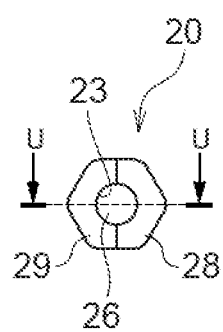
FIG. 57C shows the wood shaft, which is used in the twelfth embodiment, in a bottom view.
Figure 57D:
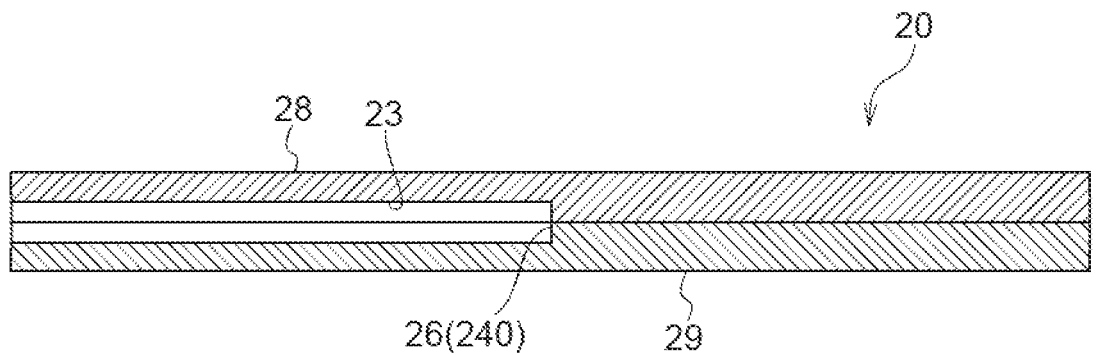
FIG. 57D shows the wood shaft, which is used in the twelfth embodiment, in a U-U cross-sectional view of FIG. 57B and FIG. 57C.
Figure 58:
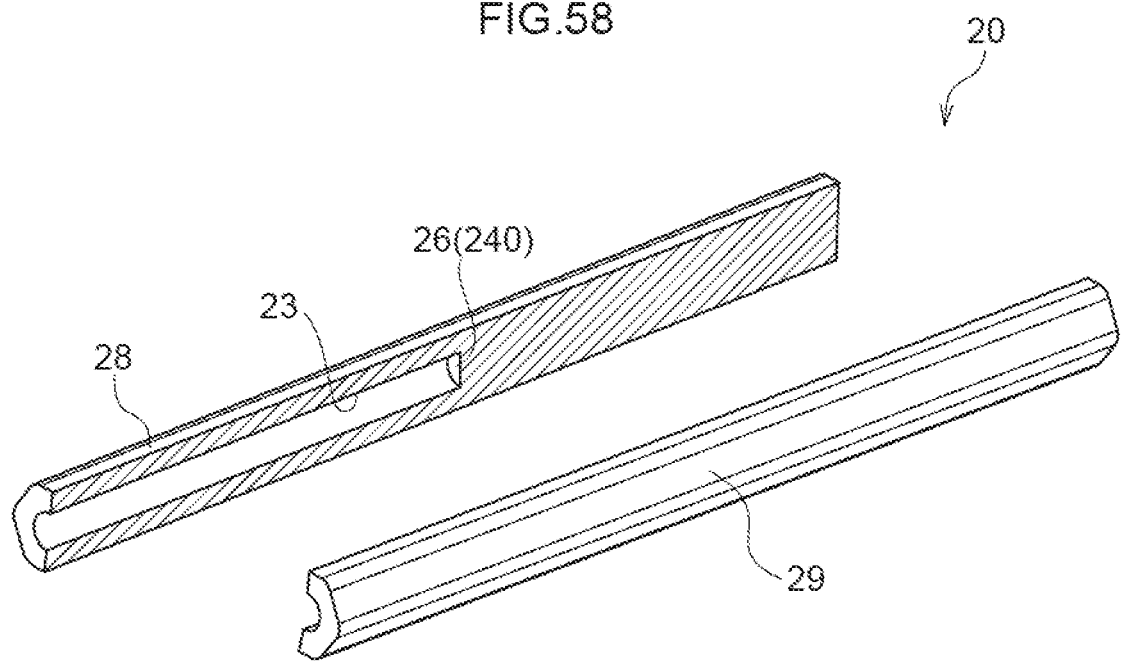
FIG. 58 shows the wood shaft of FIG. 57A through FIG. 57D in an, assembly drawing.

FIG. 53 shows a second example of the input pen 10 relating to the eleventh embodiment in a partial sectional side view. The pencil lead 150, which is a writing member having a writing function, is accommodated as the inserted member 200 in the rear half portion of the mounting hole 23 of the wood shaft 20. The distal end of the pencil lead 150 reaches a portion midway along the wood shaft 20, and the distal end edge thereof is the insertion restricting portion 240. On the other hand, the digitizer unit 40 is inserted in from the distal end of the mounting, hole 23. The press-contact portion 250 that is provided at the rear end of the digitizer unit 40 press-contacts the insertion restricting portion 240 of the distal end edge of the pencil lead 150. Namely, the insertion restricting portion 240 demarcates the insertion limit of the digitizer unit 40.

Note that the distal end of the wood shaft 20 is the taper portion 21 that is cut in a tapered form, and it is easy to see the distal end of the digitizer unit 40 at the time of using the input pen 10. Further, the rear end of the wood shaft 20 as well can be cut by a sharpener in the same way as a usual pencil, and the rear end of the input pen 10 can be used as a pencil.

FIG. 54 shows a third example of the input pen 10 relating to the eleventh embodiment in a partial sectional side view. In the present example, in the same way as in the above-described second example, the pencil lead 150 that serves as the inserted member 200 is accommodated in the rear half portion of the mounting hole 23 of the wood shaft 20, and an adjusting member 230 that serves as a spacer is interposed between the distal end of the pencil lead 150 and the rear end of the digitizer unit 40. The adjusting member 230 can be formed of an appropriate material such as a wood material, plastic or the like. Positioning of the rear end of the digitizer unit 40 at the interior of the wood shaft 20 is possible by the adjusting member 230.

FIG. 55 shows a fourth example of the input pen 10 relating to the eleventh embodiment in a partial sectional side view. A ballpoint pen refill 222, which is a writing member having a writing function, is accommodated as the inserted member 200 in the rear half portion of the mounting hole 23 of the wood shaft 20. The distal end (note that this is opposite the side where the writing tip is positioned) of the ballpoint pen refill 222 reaches a portion midway along the wood shaft 20, and the distal end edge thereof is the insertion restricting portion 240. On the other hand, the digitizer unit 40 is inserted in from the distal end of the mounting hole 23. The press-contact portion 250 that is provided at the rear end of the digitizer unit 40 press-contacts the insertion restricting portion 240 of the distal end edge of the ballpoint pen refill 222. Namely, the insertion restricting portion 240 demarcates the insertion limit of the digitizer unit 40.

Note that the distal end of the wood shaft 20 is the taper portion 21 that is cut in a tapered form, and it is easy to see the distal end of the digitizer unit 40 at the time of using the input pen 10. Further, because the rear end of the wood shaft 20 also is cut as the taper portion 21 in the same way, the writing tip is, after all, easy to see at the time when the rear end of the input pen 10 is used as a ballpoint pen. Note that, in the present example as well, as in the above-described third example, by interposing the adjusting member 230 that serves as a spacer between the distal end of the ballpoint pen refill 222 and the digitizer unit 40, positioning of the rear end of the digitizer unit 40 within the wood shaft 20 can be carried out.

FIG. 56 shows a fifth example of the input pen 10 relating to the eleventh embodiment in a partial sectional side view. An input pen unit 223 that serves as the inserted member 200 is accommodated m the rear half portion of the mounting hole 23 of the wood shaft 20. The input pen unit 223 is desirably a unit that enables a form of inputting (e.g., a pressure sensitive type, an electrostatic capacitance type, or the like) that is different than that of the digitizer unit 40, but may be an electromagnetic induction type that is the same as the digitizer unit 40. The distal end (note that this is opposite the side where the writing tip is positioned) of the input pen unit 223 reaches a portion midway along the wood shaft 20, and the distal end edge thereof is the insertion restricting portion 240. On the other hand, the digitizer unit 40 is inserted in from the distal end of the mounting hole 23. The press-contact portion 250 that is provided at the rear end of the digitizer unit 40 press-contacts the insertion restricting portion 240 of the distal end edge of the input pen unit 223. Namely, the insertion restricting portion 240 demarcates the insertion limit of the digitizer unit 40.

Note that the distal end of the wood shaft 20 is the taper portion 21 that is cut in a tapered form, and it is easy to see the distal end of the digitizer unit 40 at the time of using the input pen 10. Further, because the rear end of the wood shaft 20 also is cut as the taper portion 21 in the same way, the inputting tip is, after all, easy to see at the time when the rear end of the input pen 10 is used as another input pen. Note that, in the present example as well, as in the above-described third example, by interposing the adjusting member 230 that serves as a spacer between the distal end of the input pen unit 223 and the rear end of the digitizer unit 40, positioning of the rear end of the digitizer unit 40 within the wood shaft 20 can be carried out.

Twelfth Embodiment

The structure of the wood shaft 20 that is used in the twelfth embodiment is described with reference to FIG. 57A, FIG. 57B, FIG. 57C and FIG. 57D, and FIG. 58. As shown in the plan view of FIG. 57B and the bottom view of FIG. 57C, the wood shaft 20 presents a pillar-shaped structure of a hexagonal cross-section, and is formed by the wood shaft members 28, 29, which are divided in two along the length direction, being affixed together as shown in the assembly drawing of FIG. 58. A space, which has a circular cross-section due to grooves which are semicircular in cross-section and are bored in the front half portions of the respective wood shaft members 28, 29 being superposed on one another, is formed in the front half portion at the interior of the wood shaft 20. This is the mounting hole 23 that accommodates the digitizer unit 40 at the axial center of the wood shaft 20. Note that the digitizer unit 40 is the same as that used in the above-described eleventh embodiment. On the other hand, the rear half portion of the wood shaft 20 is solid, and the mounting hole 23 is formed as a hole with a bottom, from one end (here, the distal end) of the wood shaft 20 to a portion midway therealong. Further, a bottom surface 26 of this hole with a bottom faces toward the distal end side, and this functions as the insertion restricting portion 240 that demarcates the insertion limit of the digitizer unit 40. The wood shaft 20 is formed to be a size that is similar to that of the wood shaft of an ordinary pencil.

The material of the wood shaft 20 and the significance of using the wood shaft 20 are similar to those of the above-described eleventh embodiment.

Figure 59:
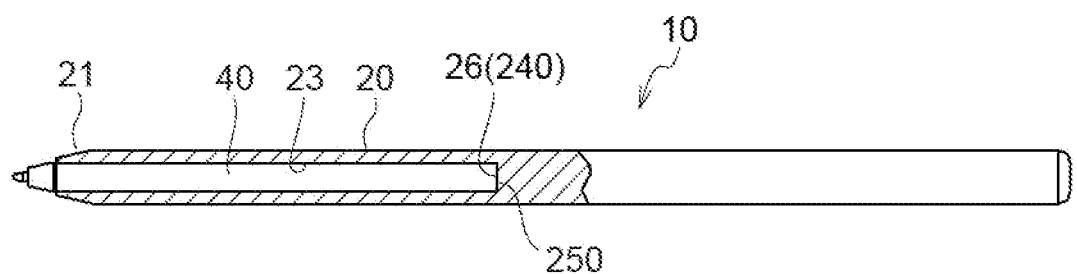
FIG. 59 shows a first example of the twelfth embodiment in a partial side sectional view.

FIG. 59 shows a first example of the input pen 10 relating to the twelfth embodiment in a partial sectional side view. The bottom surface 26 of the mounting hole 23 of the wood shaft 20 is the above-described insertion restricting portion 240, and press-contacts the press-contact portion 250 of the rear end of the digitizer unit 40 that is inserted in from the distal end of the mounting hole 23. Namely, the insertion restricting portion 240 demarcates the insertion limit of the digitizer unit 40. Note that the distal end of the wood shaft 20 is the taper portion 21 that is cut in a tapered form, and it is easy to see the distal end of the digitizer unit 40 at the time of using the input pen 10.

In the state shown in FIG. 59, between the outer peripheral surface of the digitizer unit 40 and the inner peripheral surface of the mounting hole 23, the digitizer unit 40 can be taken-out and put-in, and frictional force of an extent such that the digitizer unit 40 does not naturally fall out even if the digitizer unit 40 is turned face down in a state of being inserted in the wood shaft 20, is applied. The digitizer unit 40 engages with the wood shaft 20 due to this frictional force. This can be realized by adjusting the respective diameters of the digitizer unit 40 and the mounting hole 23.

Or, this may be realized by adjusting the respective surface roughnesses of the outer peripheral surface of the digitizer unit 40 and the inner peripheral surface of the mounting hole 23.

Figure 60:
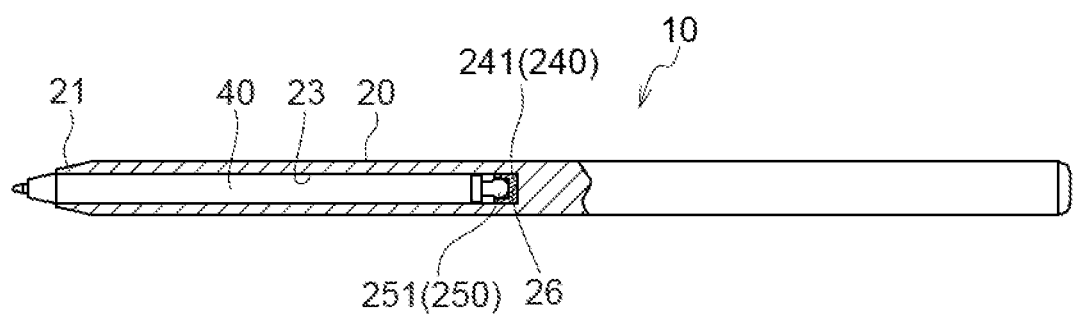
FIG. 60 shows a second example of the twelfth embodiment in a partial side sectional view.

FIG. 60 shows a second example of the input pen 10 relating to the twelfth embodiment in a partial sectional side view. A fit-together concave portion 241 that serves as the insertion restricting portion 240 is fixed to the bottom surface 26 of the mounting hole 23 of the wood shaft 20. On the other hand, a fit-together convex portion 251, which is a projection of a shape that can fit-together with this fit-together concave portion 241, is formed as the press-contact portion 250 at the rear end of the digitizer unit 40. When the digitizer unit 40 is inserted in from the distal end of the mounting hole 23, the fit-together convex portion 251 fits-together with the fit-together concave portion 241, and due to this fitting together, the digitizer unit 40 engages with the wood shaft 20, and use of the input pen 10 is possible.

If, from this state, the distal end of the digitizer unit 40 is pinched and pulled in the distal end direction, the fitting together of the fit-together convex portion 251 and the fit-together concave portion 241 is cancelled and they separate, and the digitizer unit 40 can be removed from the wood shaft 20. Note that the distal end of the wood shaft 20 is the taper portion 21 that is cut in a tapered form, and it is easy to see the distal end of the digitizer unit 40 at the time of using the input pen 10.

Figure 61:
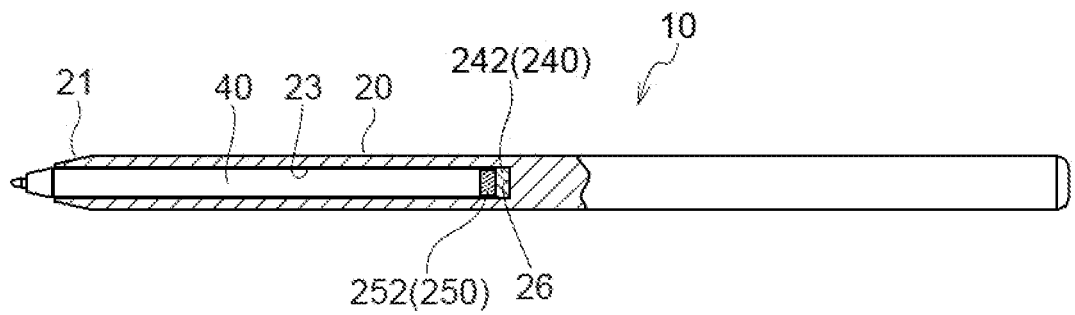
FIG. 61 shows a third example of the twelfth embodiment in a partial side sectional view.

FIG. 61 shows a third example of the input pen 10 relating to the twelfth embodiment in a partial sectional side view. A magnetic force attracting portion 242, at which one pole (e.g., the S pole) of a magnet faces in the distal end direction, is fixed as the insertion restricting portion 240 to the bottom surface 26 of the mounting hole 23 of the wood shaft 20. On the other hand, a magnetic force attracting portion 252, at which the pole (e.g., the N pole) that is the reverse of that of the magnetic force attracting portion 242 faces in the rear end direction, is fixed as the press-contact portion 250 to the rear end of the digitizer unit 40. When the digitizer unit 40 is inserted in from the distal end of the mounting hole 23, the both magnetic force attracting portions 242, 252 attract one another due to the magnetic forces thereof, and, due to this attraction, the digitizer unit 40 engages with the wood shaft 20, and use of the input pen 10 is possible.

If, from this state, the distal end of the digitizer unit 40 is pinched and pulled in the distal end direction, the mutual attraction of the magnetic force attracting portions 242, 252 is cancelled and they separate, and the digitizer unit 40 can be removed from the wood shaft 20. Note that the distal end of the wood shaft 20 is the taper portion 21 that is cut in a tapered form, and it is easy to see the distal end of the digitizer unit 40 at the time of using the input pen 10.

Figure 62:
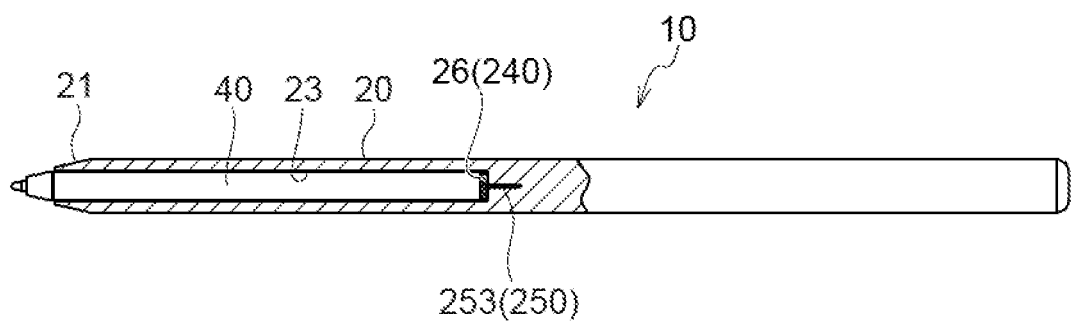
FIG. 62 shows a fourth example of the twelfth embodiment in a partial side sectional view.

FIG. 62 shows a fourth example of the input pen 10 relating to the twelfth embodiment in a partial sectional side view. A puncturing portion 253 such as the pin of a thumb-tack is fixed as the press-contact portion 250 to the rear end of the digitizer unit 40. When the digitizer unit 40 is inserted in from the distal end of the mounting hole 23, the puncturing portion 253 punctures the bottom surface 26 that serves as the insertion restricting portion 240 at the mounting hole 23 of the wood shaft 20, and, due to this puncturing, the digitizer unit 40 engages with the wood shaft 20, and use as the input pen 10 is possible. Note that the distal end of the wood shaft 20 is the taper portion 21 that is cut in a tapered form, and it is easy to see the distal end of the digitizer unit 40 at the time of using the input pen 10.

Figure 63:
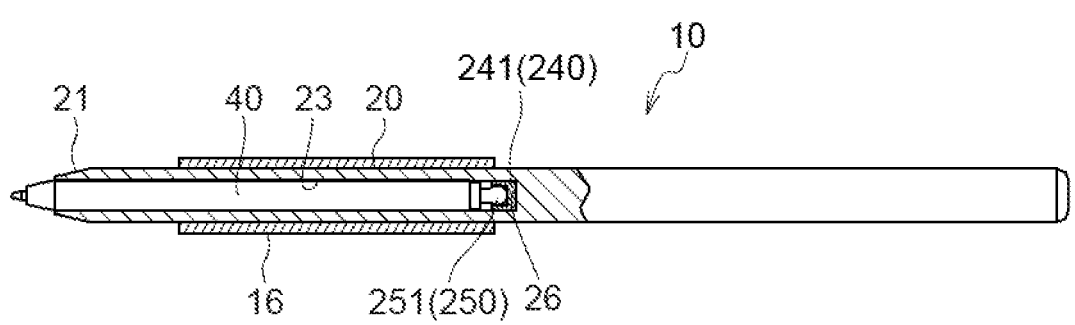
FIG. 63 shows a fifth example of the twelfth embodiment in a partial side sectional view.

FIG. 63 shows a fifth example of the input pen 10 relating to the twelfth embodiment in a partial sectional side view. In the present example, in the above-described second example, a grip portion 16, which is formed of a material that is softer than a wood material, e.g., rubber or the like, is provided at the outer periphery of the distal end side portion of the wood shaft 20. The outer diameter of the portion at which this grip portion 16 is provided is a length of an extent that cannot be inserted into an ordinary sharpener. Due thereto, the distal end side at which the digitizer unit 40 is provided being mistakenly cut by a sharpener can be prevented. Note that this grip portion 16 is not limited to the above-described second example of the present embodiment, and can be provided at other examples as well, and further, can be provided also at the respective examples of the above-described eleventh embodiment.

Figure 64:
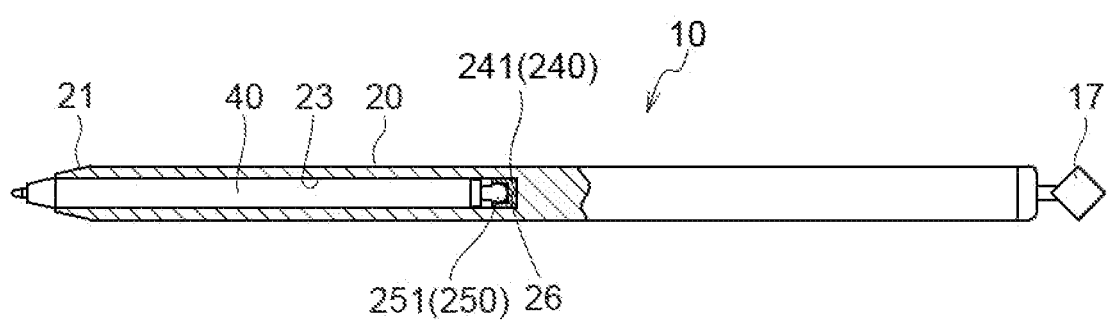
FIG. 64 shows a sixth example of the twelfth embodiment in a partial side sectional view.

FIG. 64 shows a sixth example of the input pen 10 relating to the twelfth embodiment in a partial sectional side view. In the present example, in the above-described second example, a decorative portion 17 is mounted to the rear end of the wood shaft 20. This decorative portion 17 can be used by being formed in the shape of an animal or comic book character or the like, or by having a name written thereon, or by having various types of illustrations, advertisements, company names or the like printed thereon. Note that this decorative portion 17 is not limited to the above-described second example of the present embodiment, and can be provided at the other examples as well.

Other Points

Figure 65A:
FIG. 65A schematically shows, in a plan view, an example of a hexagonal cross-section at the wood shafts of the eleventh embodiment and the twelfth embodiment.
Figure 65B:
FIG. 65B schematically shows, m a plan view, an example of a triangular cross-section at the wood shafts of the eleventh embodiment and the twelfth embodiment.
Figure 65C:
FIG. 65C schematically shows, in a plan view, an example of a circular cross-section at the wood shafts of the eleventh embodiment and the twelfth embodiment.

In the above-described eleventh embodiment or twelfth embodiment, the cross-section of the wood shaft 20 is formed in a hexagonal shape as shown in the schematic plan view of FIG. 65A, and therefore can be manufactured by applying an existing production line for pencils. However, the wood shaft 20 is not limited to this hexagonal cross-section, and can be formed as a shaft that has an equilateral triangular (FIG. 65B) or circular (FIG. 65C) cross-sectional shape, which are employed as cross-sectional shapes of pencils, or can be made to be another arbitrary shape.

INDUSTRIAL APPLICABILITY

The present invention can be used at an input pen that uses a wood shaft, and is suited to an active type input pen in particular.

The invention claimed is:

1. An input pen, comprising:
  a wood shaft,
  a mounting hole that is formed at an axial center of the wood shaft, and
  an input body that is rod-shaped and is mounted in the mounting hole,
  wherein an inner side surface of the mounting hole and an outer side surface of the input body are fixed,
  wherein, at the input body,
  a ferrite core that is positioned at an axial center,
  an electromagnetic induction coil that is disposed at an outer periphery of the ferrite core,
  a contacting distal end that is mounted to a distal end of the ferrite core, and
  a writing pressure sensing portion that senses pressing force applied to the contacting distal end,
  are structured as a refill, and wherein:
  the input body is accommodated in the mounting hole,
  an insertion restricting portion, which demarcates an insertion limit of the input body in the mounting hole, is provided at a midway portion of the wood shaft,
  a rear end of the input body is formed as a press-contact portion that press-contacts the insertion restricting portion,
  the mounting hole is a hole with a bottom that is from one end of the wood shaft to the midway portion, a bottom surface, which faces a distal end side, of the hole with a bottom is the insertion restricting portion, and a fit-together concave portion is formed at the bottom surface at the insertion restricting portion,
  a fit-together convex portion that serves as the press-contact portion is formed at the rear end of the input body, and
  the input body engages with the wood shaft due to the fit-together convex portion fitting together with the fit-together concave portion.

2. The input pen of claim 1, wherein the input pen has a binding agent that is interposed between the inner side surface of the mounting hole and the outer side surface of the input body, and that binds the input body to the mounting hole.

3. The input pen of claim 1, wherein the wood shaft is formed by two members being affixed together by an affixing agent.

4. The input pen of claim 2, wherein the wood shaft is formed by two members being affixed together by an affixing agent.

5. The input pen of claim 1, wherein a reinforcing resin is made to seep into the mounting hole.

6. The input pen of claim 2, wherein a reinforcing resin is made to seep into the mounting hole.

7. An input pen, comprising:
  a wood shaft,
  a mounting hole that is formed at an axial center of the wood shaft, and
  an input body that is rod-shaped and is mounted in the mounting hole,
  wherein an inner side surface of the mounting hole and an outer side surface of the input body are fixed,
  wherein, at the input body,
  a ferrite core that is positioned at an axial center,
  an electromagnetic induction coil that is disposed at an outer periphery of the ferrite core,
  a contacting distal end that is mounted to a distal end of the ferrite core, and
  a writing pressure sensing portion that senses pressing force applied to the contacting distal end,
  are structured as a refill, and wherein:
  the input body is accommodated in the mounting hole,
  an insertion restricting portion, which demarcates an insertion limit of the input body in the mounting hole, is provided at a midway portion of the wood shaft,
  a rear end of the input body is formed as a press-contact portion that press-contacts the insertion restricting portion,
  the mounting hole is a hole with a bottom that is from one end of the wood shaft to the midway portion, a bottom surface, which faces a distal end side, of the hole with a bottom is the insertion restricting portion, and magnetic force attracting portions that attract one another by magnetic forces are provided at the bottom surface at the insertion restricting portion and at the rear end of the input body, and
  the input body engages with the wood shaft due to the magnetic force attracting portion of the insertion restricting portion and the magnetic force attracting portion of the input body that serves as the press-contact portion attracting one another.

8. An input pen, comprising:
a wood shaft,
a mounting hole that is formed at an axial center of the wood shaft, and
an input body that is rod-shaped and is mounted in the mounting hole,
wherein an inner side surface of the mounting hole and an outer side surface of the input body are fixed,
wherein, at the input body,
a ferrite core that is positioned at an axial center,
an electromagnetic induction coil that is disposed at an outer periphery of the ferrite core,
a contacting distal end that is mounted to a distal end of the ferrite core, and
a writing pressure sensing portion that senses pressing force applied to the contacting distal end,
are structured as a refill, and wherein:
the input body is accommodated in the mounting hole,
an insertion restricting portion, which demarcates an insertion limit of the input body in the mounting hole, is provided at a midway portion of the wood shaft,
a rear end of the input body is formed as a press-contact portion that press-contacts the insertion restricting portion,
the mounting hole is a hole with a bottom that is from one end of the wood shaft to the midway portion, a bottom surface, which faces a distal end side, of the hole with a bottom is the insertion restricting portion, and a puncturing portion, which projects out rearward and serves as the press-contact portion, is provided at the rear end of the input body, and
the input body engages with the wood shaft due to the insertion restricting portion being punctured by the puncturing portion.

9. A method of manufacturing an input pen, the input pen comprising:
a wood shaft,
a mounting hole that is formed at an axial center of the wood shaft, and
an input body that is rod-shaped and is mounted in the mounting hole,
wherein an inner side surface of the mounting hole and an outer side surface of the input body are fixed,
wherein, at the input body,
a ferrite core that is positioned at an axial center,
an electromagnetic induction coil that is disposed at an outer periphery of the ferrite core,
a contacting distal end that is mounted to a distal end of the ferrite core, and
a writing pressure sensing portion that senses pressing force applied to the contacting distal end,
are structured as a refill,
the input pen has a binding agent that is interposed between the inner side surface of the mounting hole and the outer side surface of the input body, and that binds the input body to the mounting hole, and
the wood shaft is formed by two members being affixed together by an affixing agent,
the method comprising:
a step of, at one wood shaft member among the two members that has a groove that is semicircular in cross-section, placing, in the groove, a synthetic resin rod that is in a state in which the binding agent has been applied to a surface thereof, or placing, in the groove, a synthetic resin rod in a state in which the binding agent has been applied to the groove;
a step of affixing, to the one wood member and by the affixing agent, another wood shaft member among the two members that has a groove of a same shape as the groove;
a step of forming the wood shaft from the two members that have been affixed together;
a step of pulling the synthetic resin rod out from the wood shaft and forming the mounting hole; and
a step of inserting the input body into the mounting hole with the binding agent interposed therebetween.

* * * * *